United States Patent
Takubo et al.

[11] Patent Number: 5,961,596
[45] Date of Patent: Oct. 5, 1999

[54] METHOD OF MONITORING A COMPUTER SYSTEM, FEATURING PERFORMANCE DATA DISTRIBUTION TO PLURAL MONITORING PROCESSES

[75] Inventors: Shunji Takubo, Hachioji; Nobutoshi Sagawa, Koganei; Tadashi Ohta, Higashi-Murayama; Susumu Yamaga, Fussa, all of Japan

[73] Assignees: Hitachi, Ltd.; Hitachi ULSI Engineering Corp., both of Tokyo, Japan

[21] Appl. No.: 08/800,468

[22] Filed: Feb. 14, 1997

[30] Foreign Application Priority Data

Feb. 14, 1996 [JP] Japan .................................. 8-026437

[51] Int. Cl.[6] .................................................. G06F 15/173
[52] U.S. Cl. ............................................ 709/224; 709/223
[58] Field of Search ............................... 395/673, 200.54, 395/200.53; 702/186, 179; 709/224, 223, 4

[56] References Cited

U.S. PATENT DOCUMENTS

| | | | |
|---|---|---|---|
| 5,432,932 | 7/1995 | Chen et al. | 395/650 |
| 5,483,468 | 1/1996 | Chen et al. | 702/186 |
| 5,758,083 | 5/1998 | Singh et al. | 395/200.53 |
| 5,802,303 | 8/1998 | Yamaguchi | 395/200.54 |

FOREIGN PATENT DOCUMENTS

| | | |
|---|---|---|
| 91-62257 | 3/1991 | Japan . |
| 93-158903 | 6/1993 | Japan . |
| 94-019865 | 1/1994 | Japan . |
| 96-044680 | 2/1996 | Japan . |

OTHER PUBLICATIONS

"New HP PerfView Software"Technical Data and English translation of the same.

Ser. No. 08/510073 Aug. 1, 1995.

"IBM Parallel Environment for AIX Operation and Use Version 2.1.0"pp. 263–265 1995.

Hansen et al, "A Scalable Performance Analysis Tool for PowerPC Based MPP Systems", *Proceedings of the 1st Aizu Intl Symposium on Parallel Algorithms/Architecture Syntheses*, Mar. 15 –17, 1995, pp. 78 –84, XP000672397, Japan.

Bemmerl et al, "Adapting the Portable Performance Measurement Tool PATOP to the Multi–Transputer Monitoring System DELTA–T", *Programming Environments for Parallel Computing*, Apr. 6 –8, 1992, pp. 151 –160, XP000672426, UK.

*Primary Examiner*—Ellis B. Ramirez
*Assistant Examiner*—William Titcomb
*Attorney, Agent, or Firm*—Antonelli, Terry, Stout & Kraus, LLP

[57] ABSTRACT

In order to enable monitoring of a computer of a monitoring target, by two or more computers by way of a network, without increasing the load of the computer of monitoring target, the capturing process invoked on each node of the parallel computer captures performance data, the collecting process invoked on a specific node collects these captured performance data, and transmits to the relaying process on the monitoring computer. If there is a display process and a logging process invoked on the same or different monitoring computers, the relaying process distributes the performance data to them. The display process displays the performance data for part of measurement items included in the distributed performance data on the display device. The logging process stores all the distributed performance data in the storage device.

40 Claims, 14 Drawing Sheets

FIG. 5
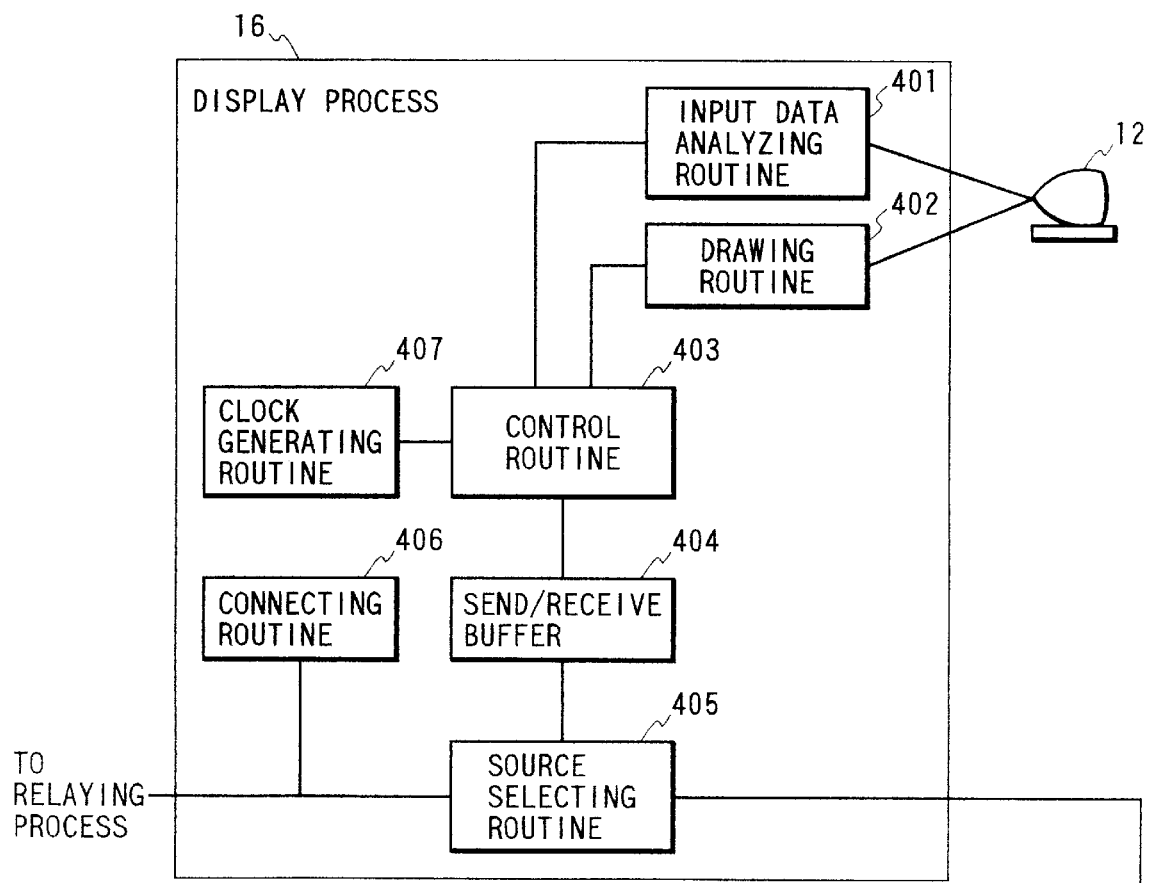
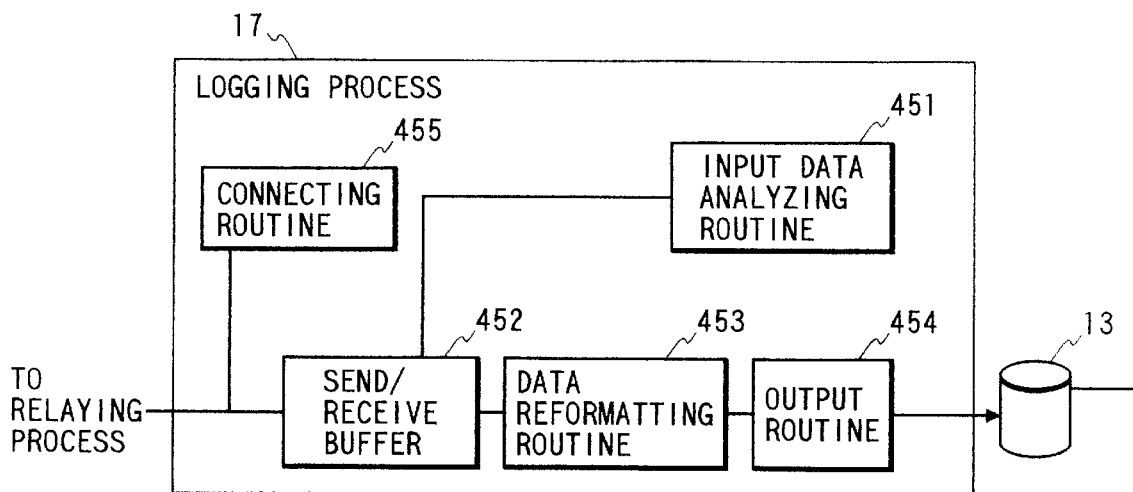

TO FIG. 6B

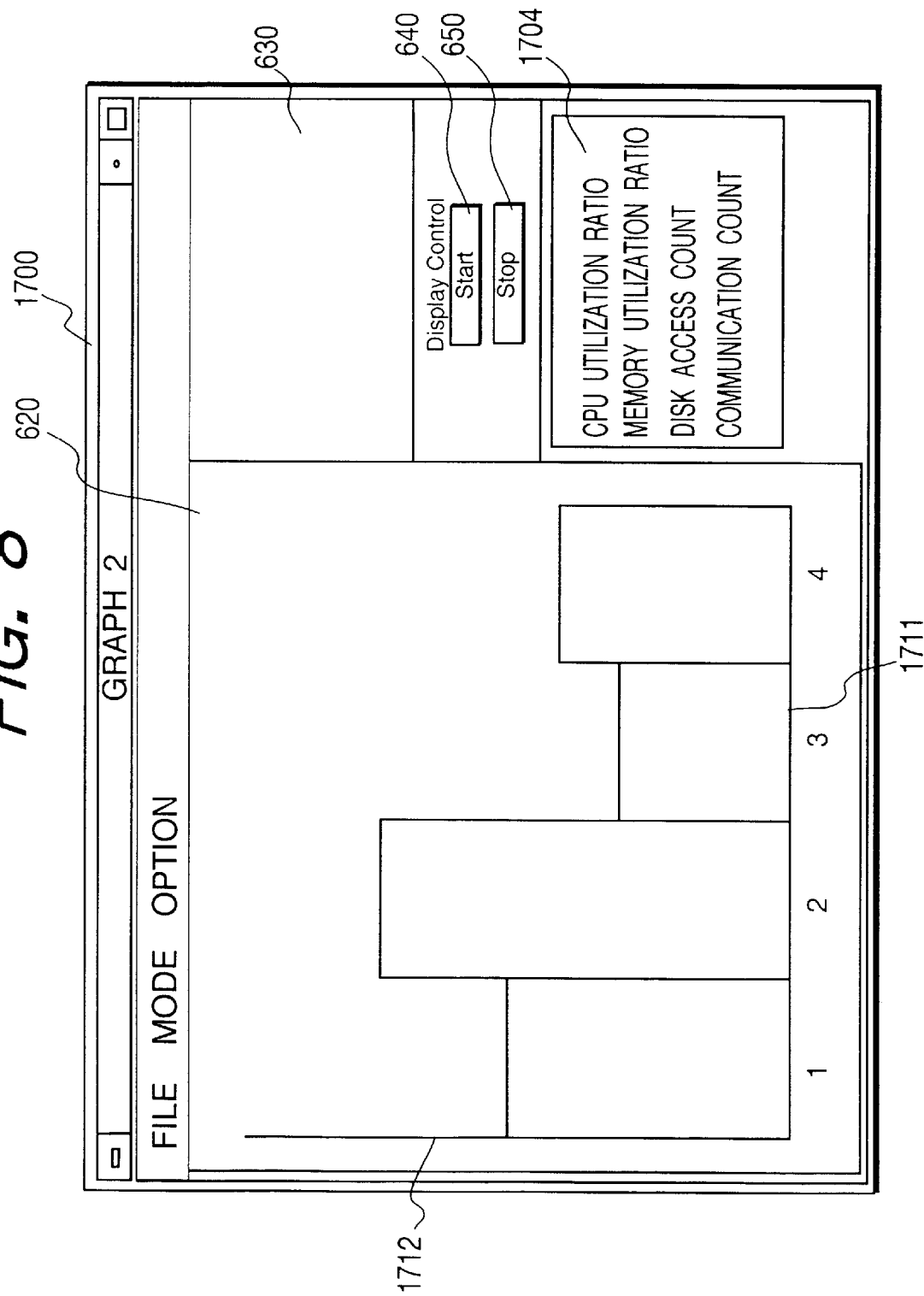

METHOD OF MONITORING A COMPUTER SYSTEM, FEATURING PERFORMANCE DATA DISTRIBUTION TO PLURAL MONITORING PROCESSES

BACKGROUND OF THE INVENTION

The present invention relates to a method of performance monitoring which captures and displays performance data in a computer system which connects two or more computers with a network, a computer system therefor and a program storage medium therefor, and especially to a performance monitoring method suitable for a parallel computer or a distributed system.

In a parallel computer or a distributed system, their operations become very complex compared with a sequential computer, because computers called nodes, which compose it, operate cooperatively in parallel, and the operations of the nodes depend on those of other nodes, as exemplified by internode-communication. In order to use such a parallel computer effectively and to induce enough performance of the parallel computer, it is necessary to grasp accurately not only the operation of each node but also the complex operation status of the parallel computer including the causal relation among operations of nodes and the balance of loads among the nodes, and to make use of that information to tune the programs being executed.

As for prior art which supports the grasping of operation status of a computer, the following two methods have been chiefly used. The first one is adopted, for example, by PerfView produced by Hewlett-Packard Co., and it measures performance data of each node of a distributed system related to the operation status of the node such as the operation status of CPU, the state of use of the memory, and the communication frequency of the network. The measured performance data is stored in the storage device in the node, such as a magnetic disk storage device and so on. The performance data stored in each node is further accumulated in one computer connected to the distributed system and is displayed graphically or so, to aid visual grasp of the performance data.

The second one is represented, for example, by Visualization Tool produced by IBM, a process which captures performance data is invoked on each node of a parallel computer, and a display process invoked on a controlling computer connected to the parallel computer through the network receives performance data from the capturing process of each node in real time and displays the performance data received from each node. For instance, refer to "IBM Parallel Environment for AIX Operation and Use Version 2.1.0," pp. 26–3265, 1995 (Document Number GC23-3891-00), issued by International Business Machines Corp.

SUMMARY OF THE INVENTION

In general, a parallel computer or a distributed system is shared by two or more users. Therefore, it is preferable for two or more users to be able to monitor performance data of such a computer through the network in real-time. According to the first method, performance data of each node can be accumulated in the storage device, but the operation status of the distributed system cannot be grasped in real time, because the performance data is analyzed and is displayed, after the measurement of the performance data is finished. According to the second method, it is possible for the display process to receive performance data from the capturing process on each node in real time and to display it, but the reference document mentioned above does not disclose concretely a method of monitoring the performance data of the same monitoring target computer by two or more users.

When performance data of the same monitoring target computer is monitored by two or more users, it is further preferable that the load of the monitoring target computer due to monitoring of the monitoring target computer itself does not increase as the number of the monitoring users increases.

Therefore, it is an object of the present invention to provide a method of monitoring computer performance which is adapted for monitoring by two or more users in real time, with suppressing increase of the load to a monitoring target computer due to the performance measurement thereof, a computer system therefor and a program storage medium therefor.

To achieve the above-mentioned object, according to the present invention, a computer of the monitoring target captures performance data of its own repeatedly and transmits it to a computer for operation status monitoring through a network. A relaying process, invoked on this computer for operation status monitoring, receives and transfers the received performance data to one, two or more utilizing processes invoked on the same or different computers. The performance data measured includes plural performance data for plural measurement items. The utilizing processes may be display processes or logging processes. When a display process receives the performance data transferred by the relaying process, it displays part of the performance data corresponding to part of the plural measurement items on a display device connected to the computer on which the display process is invoked. When a logging process receives the performance data transferred by the display process, it stores all of the performance data into a storage device connected to the computer on which the logging process is invoked.

According to one preferable mode of operation of the present invention, when the computer of monitoring target is a parallel computer, performance data which a capturing process invoked on each node of the parallel computer has captured is collected by a collecting process invoked on a predetermined one node, connected to the network, in a parallel computer, and is further transferred to the relaying process.

BRIEF DESCRIPTION OF THE DRAWINGS

FIG. 5 is a module diagram of a display process and a logging process in the parallel computer performance monitoring system of FIG. 1.

FIG. 8 shows another example of a display screen of performance data.

DESCRIPTION OF THE EMBODIMENTS

Figure 1:
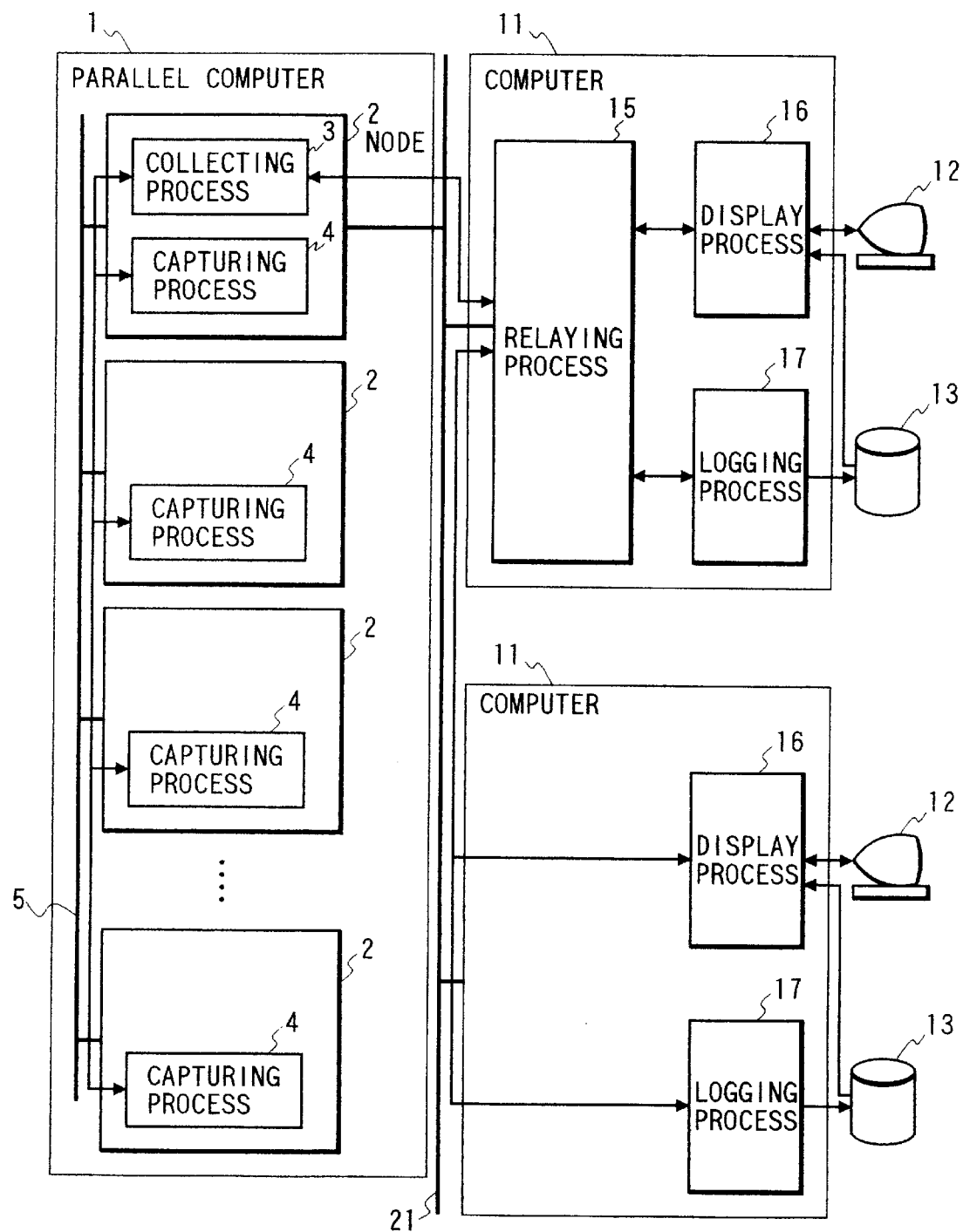
FIG. 1 is a schematic diagram of a parallel computer performance monitoring system according to the present invention.

A performance monitoring method according to the present invention will be explained in more details with reference to one or several embodiments or their modifications shown in the drawings. The same or like numerals represent the same or like elements. With the second or later embodiment, differences between it and the first embodiment will be mainly explained.

EMBODIMENT 1

Figure 12:
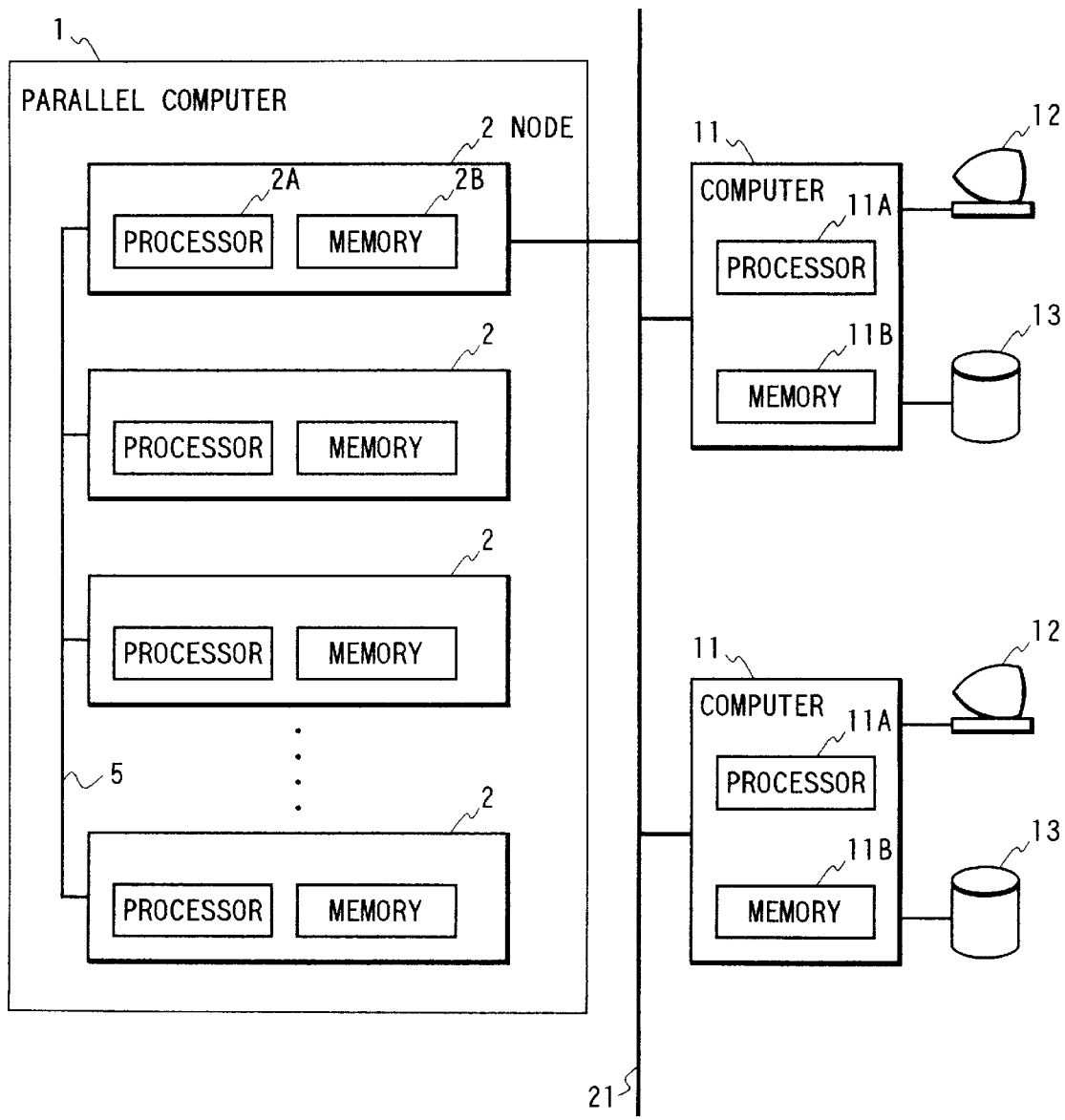
FIG. 12 is a schematic diagram of a parallel computer to which the performance monitoring method by the present invention is applied.

Referring to FIG. 12, the parallel computer 1 comprises plural nodes 2 and at least one internal network 5 which connects those nodes 2. Each node is composed of at least one processor 2A and a memory 2B, etc. The memory 2B of each node holds a program which the processor 2A of the node executes as well as data for the program. Each node or part of the nodes further has a peripheral device such as a magnetic storage device, but the peripheral device is not shown for simplification. One specific node of the parallel computer 1 is connected to the external network 21. Two or more computers 11 can be connected to the external network 21. The above-mentioned one node and these computers communicate mutually by way of the network 21. The parallel computer 1 is a computer of monitoring target and the two computers 11 connected to the external network 21 are examples of the computers used for monitoring. Other computers connected to the network 21 are not shown in FIG. 12 for simplification. Each computer 11 is composed of the processor 11A and the memory 11B. The input/output device 12 which contains display device, the keyboard and so on, and the storage device 13 such as a magnetic disk storage device are connected to the computer 11. Each processor is controlled by a suitable operating system (OS), for instance, UNIX (registered trademark of X/Open Company Limited in the United States of America and other countries).

The five kinds of processes which compose the monitoring system in the present embodiment and the relations between the processes are shown in FIG. 1. The capturing process 4 is executed on each node 2 of the parallel computer 1. This capturing process 4 captures performance data of each node 2 repeatedly at a constant time interval. The collecting process 3 is executed on the specific node connected to the external network 21 among two or more nodes 2 of the parallel computer 1. The collecting process collects the performance data of each node which the capturing process 4 on each node has captured and transmits it to one monitoring computer 11.

On the other hand, the relaying process 15, the display process 16, and the logging process 17 are invoked on this one monitoring computer 11. The relaying process 15 is invoked on only one of the monitoring computers 11, and transmits and receives data with the collecting process 3. The display process 16 and the logging process 17 are invoked by one user or two or more users. The user or users can invoke as many display processes 16 or logging processes as they require. These processes can receive the performance data distributed by the relaying process 15. The display process displays on the display device in the input/output device 12, part of the distributed performance data corresponding to part of the plural measurement items. The logging process stores the whole of the distributed performance data in storage device 13. These display process 16 and logging process 17 need not be invoked necessarily on the monitoring computer 11 on which the relaying process 15 has been invoked, but can be invoked on other computers connected to the monitoring computer 11 by way of the network 21. Moreover, two or more display processes 16 can be invoked on any one monitoring computer 11. Similarly, it is also possible to invoke two or more logging processes 17 on the monitoring computer 11.

Figure 6A:
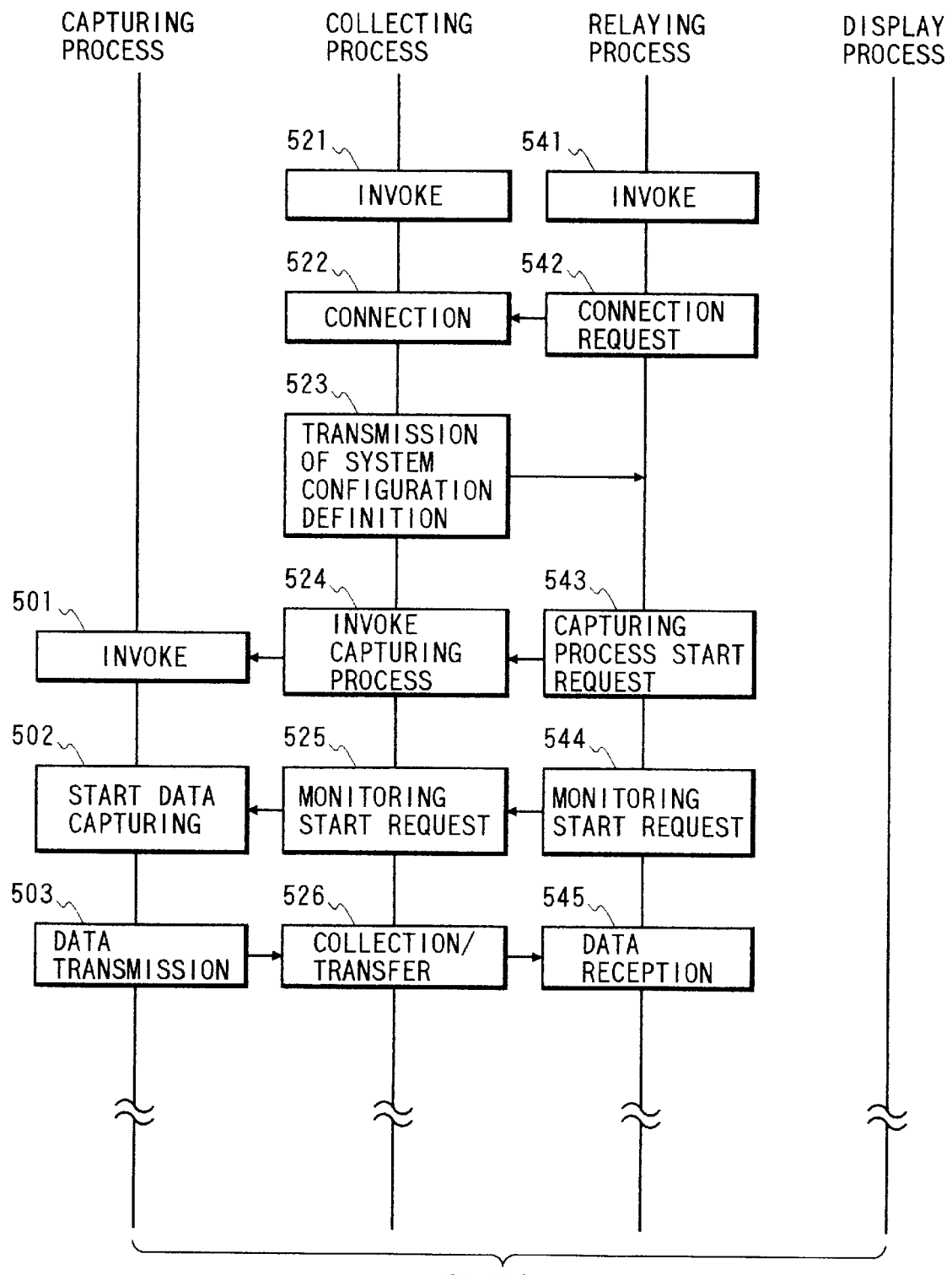
FIG. 6A is a flow chart of part of the processing procedure of a parallel computer performance monitoring method adopted in the system of FIG. 1.
Figure 6B:
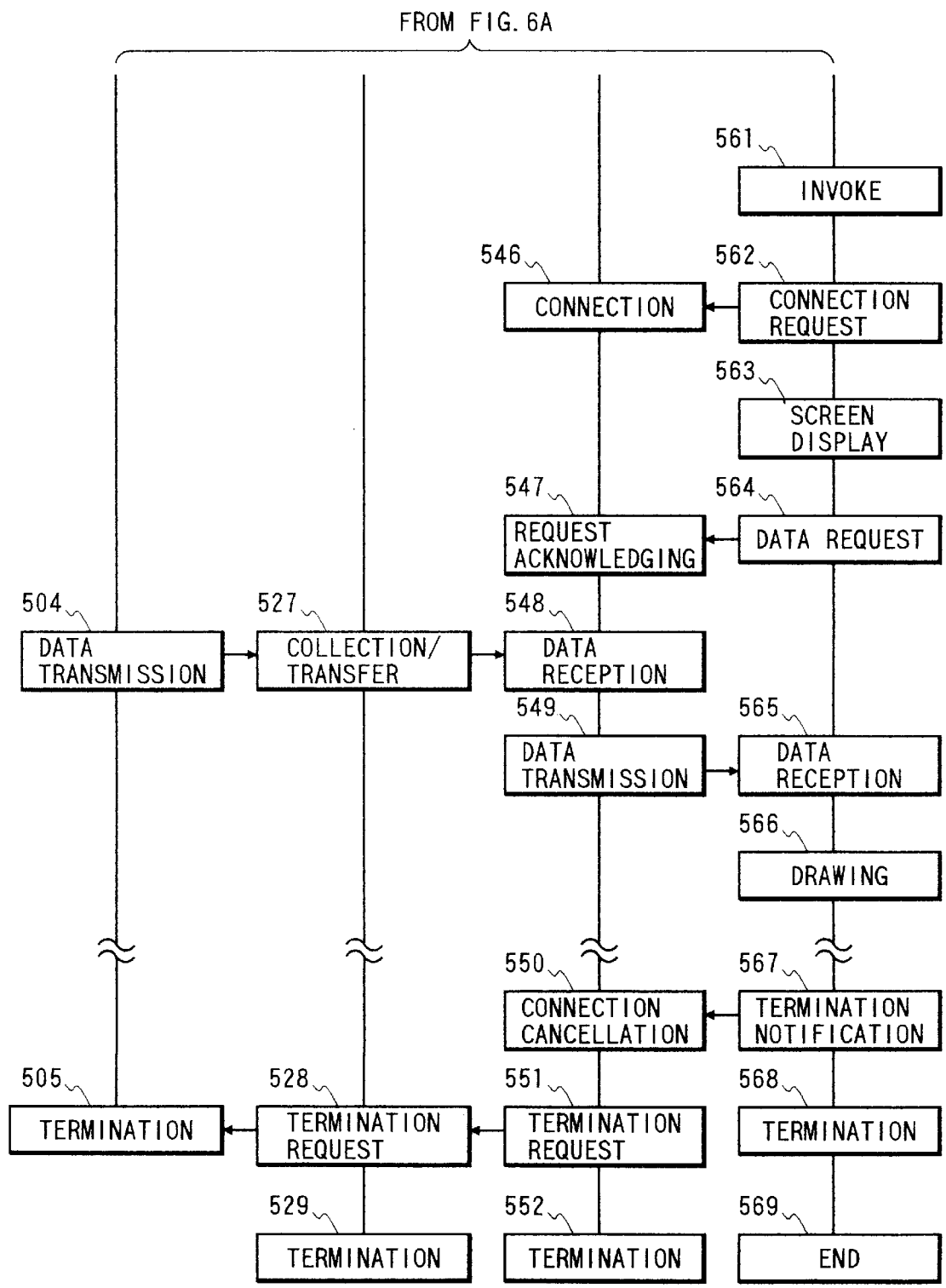
FIG. 6B is a flow chart of another part of the processing procedure of a parallel computer performance monitoring method adopted in the system of FIG. 1.

Next, it will be explained how each process of the present monitoring system cooperatively operates, by referring to the flow chart of FIGS. 6A and 6B and to the internal structure of the five processes shown in FIGS. 2 to 5. The collecting process 3 is invoked on the above-mentioned specific node 2, connected to the external network 21, in the parallel computer 1 (step 521 (FIG. 6A)). Usually, the invocation of this collecting process 3 is executed by inputting a collecting process invocation command to the parallel computer 1, by the system administrator. The collecting process 3 executes initialization when invoked. For instance, the configuration definition file 208 (FIG. 3) is read. The file describes the configuration of the parallel computer 1, such as the number of nodes, attribute of each node, and the number of measuring nodes. The attribute of each node includes the address of each node and the peripheral device description as to whether a peripheral device like a magnetic disk storage device is attached to the node. When the initialization ends, the collecting process 3 waits for the connection request from the relaying process 15 which will be invoked on one monitoring computer 11.

Next, the relaying process 15 is invoked on one monitoring computer 11 (step 541). Usually, the invocation of the relaying process 15 is executed by entering a relaying process invocation command from the monitoring computer 11 by the system administrator. This relaying process 15 can be invoked on any arbitrary computer connected to the parallel computer 1 by way of the network 21. It is a normal practice, however, to invoke the relaying process on a specific computer accessible by a group of users, such as a control workstation for the parallel computer 1, because there is a possibility that the present process is connected from two or more display processes invoked on plural computers by two or more users. The system administrator inputs, as an argument of the process invocation command for this relaying process 15, a parameter such as an Internet Protocol address information of the parallel computer 1 (or, its host name) needed when a connection request is to be supplied to the collecting process 3, and a time interval of capturing performance data. The Invoked relaying process 15 issues a connection request to the collecting process 3 by the connection routine 305 of FIG. 4 (step 542). The connection request can be implemented by the connect system call used in UNIX. At this point, Internet Protocol address information of the parallel computer 1 given as an argument of the invocation command is used as identification information of the collecting process 3 to which the connection request is to be issued.

In the collecting process 3 which has received the connection request, the connection routine 202 executes connection to the connection routine 305 (FIG. 4) in the relaying process 15, thereby enabling the collecting process 3 to transmit and receive data to or from the relaying process 15 (step 522). After completion of the connection, the collecting process 3 transmits to the relaying process 15, the configuration definition of the parallel computer 1 previously read from the configuration definition file 208 (step 523).

The present system exchanges data requests, by transferring messages between the processes which compose the system. In the present embodiment, a message is comprised of byte series of variable-length. The first byte is an identifier field which holds an identifier indicative of a kind of the message, and the succeeding data field holds the body of the data. A message may be comprised of only the identifier field.

For transmission of the configuration definition by the step 523 above, the internal processing routine 207 (FIG. 3) in the collecting process 3 forms a message, which includes the configuration definition, in the input/output buffer 203 provided in correspondence to the relaying process 15. That is, the identifier field holds an identifier of one byte which shows that the present message includes the configuration definition and the data field holds the Internet Protocol address of the monitoring computer 11. The message composed like this is sent to the relaying process 15 by using the send system call of UNIX through the network 21.

When the relaying process 15 receives this message from the collecting process 3, the input analysis routine 306 (FIG. 4) detects, based upon the identifier in the message, that the message is about the configuration definition of the parallel computer 1. The input analysis routine 306 further calculates the sizes of the input/output buffers 301,302 necessary for transferring performance data, based upon the number of nodes included in the configuration definition. The calculated sizes are used when those input/output buffers are allocated later on. One input/output buffer 301 or 302 is allocated corresponding to each display process 16 or logging process 17 which will be invoked later on. The sizes of these input/output buffers only have to be equal to or grater than the length of the performance data captured at one time step by one capturing process 4 in one node in the parallel computer 1, multiplied by the number of nodes.

Next, the relaying process 15 requests the collecting process 3 to invoke the capturing process 4 in each node (step 543). Concretely, the relaying process 15 transmits a message which contains a request identifier indicative of the invocation request, to the collecting process 3, similarly to the transfer of the computer configuration definition. When the collecting process 3 receives it, the input analysis routine 205 identifies the content of the request from the identifier.

In response to the request to invoke the capturing process 4 given by the relaying process 15, the collecting process 3 invokes the capturing process 4 on each node 2, using the node address in the configuration definition previously received (step 524). The remote shell functionality of UNIX is used for the invocation. When invoked (step 501), the capturing process 4 executes initialization including execution of connection with the collecting process 3 by the connection routine 100 (FIG. 2), by using tile connect system call of UNIX. Thereafter, the capturing process 4 waits for a monitoring start-up to be requested by the collecting process 3.

When connection with the collecting process 3 by the capturing process 4 on each node has been established, the collecting process 3 notifies the relaying process 15 of completion of the invocation processing. In response to the notification, the relaying process 15 requests the collecting process 3 to start monitoring (step 544). The message which the relaying process 15 transmits to the collecting process 3 to request the start-up of monitoring includes an identifier indicative of the kind of the request and information on the time interval for capturing the performance data.

At receipt of the start request message, the collecting process 3 transfers a start-up request message to the capturing process 4 in each node (step 525). When the capturing process 4 is invoked, the counter control/reading routine 104 issues the select system call, and the capturing process 4 shifts into the state of waiting for message arrival. When the capturing process 4 detects message arrival based upon a return from the select system call, the processing of the capturing process 4 moves to the input analysis routine 102. The input analysis routine 102 issues the receive system call and reads the message which has arrived, into the input/output buffer 101.

When the input analysis routine 102 confirms that the identifier at the first field of the message is the monitoring start-up request identifier, the input analysis routine 102 takes out the time interval for capturing performance data included in the message, and returns to the counter control/reading routine 104, using this time interval as a return value. When the capturing process 4 receives the capturing start request and the capturing process 4 reads the capturing time interval included in the request, the counter control/reading routine 104 sets this capturing time interval in the clock generating routine 107, and the clock generating routine 107 generates an interrupt into the counter control/reading routine 104 at the given time interval set in the clock generating routine 107.

Whenever the counter control/reading routine 104 receives the interrupt from the clock generating routine 107, the counter control/reading routine 104 issues a function call such as the rstat system call which is the system call of UNIX for capturing performance data, and captures performance data from the OS 105 (step 502). The performance data to be captured are for plural measurement items, and the number and kinds of the measurable items are predetermined depending on the specification of the above-mentioned function call. Usually, performance data such as the CPU availability within a unit time, the memory utilization ratio, the magnetic disk storage device access frequency, and the communication count by the network (that is, the transmission count and the receive count) can be obtained.

OS 105 reads these performance data from the software counter 106 within the kernel and from hardware counters in the node, and returns them as output arguments of the rstat system call. When the counter control/reading routine 104 of the capturing process 4 has captured performance data, the counter control/reading routine 104 stores the captured performance data into the input/output buffer 101, and hands the control to the output control routine 103. The output control routine 103 issues the send system call, thereby transmitting the content of the input/output buffer 101 to the collecting process 3 through the internal network 5 (step 503).

In the collecting process 3, the internal processing routine 207 (FIG. 3) monitors arrival of a message from the capturing process 4 on one of the nodes, by using a select function which is the system call of the OS. The message is one which contains individual performance data of one of the nodes. When the arrival of the message is confirmed, the internal processing routine 207 invokes the input analysis routine 205. The input analysis routine 205 issues the receive system call and reads the individual performance data included in the received message into the input/output buffer 201. Then, the input analysis routine 205 stores the identifier of the capturing process which has sent the message, and checks whether the performance data has been transmitted from all of the capturing processes 4 on the nodes, and returns the control to the internal processing routine 207. If there is at least one capturing process 4 which has not transmitted performance data yet, the internal processing routine 207 issues the select system call and continues to monitor arrival of a message which contains individual performance data from that capturing process 4.

If individual performance data has arrived at the collecting process 3 from all the capturing processes 4 invoked on the nodes 2, the internal processing routine 207 copies all the individual performance data held in the input/output buffers 201 provided for all the capturing processes 4 on all the nodes 2, into the input/output buffer 203 provided for the relaying process 15, and assembles those copied individual performance data into one message. The message includes a request identifier and succeeding series of plural individual performance data which have been sent from the capturing processes 4 on the nodes 2.

Next, the internal processing routine 207 invokes the output control routine 206. The output control routine 206 issues the send system call of UNIX and transmits the message which contains the performance data to the relaying process 15 (step 526).

In the relaying process 15, the internal processing routine 308 issues the select system call of UNIX and waits for message arrival from the collecting process 3. When the internal processing routine 308 detects arrival of the message from the collecting process 3, it shifts the control to the input analysis routine 306. The input analysis routine 306 issues the receive system call of UNIX and reads the performance data in the message into the input/output buffer 304 which is provided in correspondence to the collecting process 3 (step 545).

After receipt of the performance data, the relaying process 15 confirms whether the display process 16 or the logging process 17 is connected to itself. When any of the display process 16 and the logging process 17 is not connected to the relaying process 15, the following transfer processing of the received performance data is not executed.

When at least one display process 16 is connected to the relaying process 15, the relaying process 15 copies the message from the input/output buffer 304 into the input/output buffer 301 which is connected to the display process 16 with one to one correspondence, thus distributing the performance data to the display process 16 connected to the input/output buffer 301.

If there are plural input/output buffers 301 to which plural display processes 16 are connected, the relaying process 15 distributes the performance data to all the display processes 16 in the same way. When a logging process 17 is connected to the relaying process 15, the input/output buffer 301 provided in correspondence to the logging process 17 is used. The details of the present distribution processing will be described later on.

Thus, the user of the present monitoring system can use the display process 16 or the logging process 17, if he invokes the display process 16 or the logging process 17 after the capturing process 4, the collecting process 3, and the relaying process 15 are invoked by the system administrator. In this case, the other computer 11 for monitoring shown in FIG. 1 may be placed on user's desktop. Thus, it is possible to monitor the performance data of the parallel computer 1, from a computer which the system administrator controls and a personal general purpose computer provided in a remote location from the former computer. In the present specification, a general-purpose computer is also called a computer for monitoring, if it is used for the monitoring.

In the present embodiment, the relaying process 15 can be invoked on an arbitrary computer, and the display process 16 or the logging process 17 which uses the performance data can be invoked on an arbitrary computer. Performance data for plural measurement items predetermined beforehand is captured, without depending on measurement items which the individual display process 16 requests, and thereafter, the display process 16 selects and uses performance data for the specific measurement items from the distributed performance data. If enough number of measurement items are captured by default, the performance data selected therefrom can fulfill the user's request.

In addition, all the performance data for plural predetermined measurement items captured are stored in the storage device when a logging process is connected to the relaying process 15, so that a user can select performance data for an arbitrary measurement item later on. For this use, too, the performance data for predetermined measurement items are captured without depending on measurement items which a user selects.

In addition, the collecting process, the capturing process, and the relaying process are invoked independently of the invocation of a display process or a logging process. The relaying process distributes performance data captured by the capturing processes to a display process or a logging process, when the latter is invoked. As a result, even if presence of an invoked display process or the number of the invoked display processes changes, the relaying process, the collecting process and the capturing processes only have to execute the same processing.

The operation of the display process 16 is as follows. The user of the present monitoring system invokes the display process 16 on a monitoring computer 11 which he uses (step 561 (FIG. 63)). At that time, the user has to be informed of the Internet Protocol address of the computer on which the relaying process 15 is invoked beforehand, and specifies it as an argument of invocation of the display process 16. When two or more users use the present monitoring system, they usually use different monitoring computers. For instance, two users use different ones of the two monitoring computers 11 shown in FIG. 1. In the present embodiment, two or more display processes can be invoked on the same computer 11 which the same user uses.

At least one display process (a display process of the first kind) is composed so as to selectively display performance data for a measurement item predetermined for the display process, among the performance data for plural measurement items distributed by the relaying process 15, using a graphical symbol or a graphical representation predetermined for the display processes.

Another display process (a display process of the second kind) is composed so as to display performance data for one or plural measurement items which a user selects after invocation of the display process, using a graphical symbol or a graphical representation predetermined for the display process. Two or more display processes of the second kind are available in the present embodiment, and they are composed so that they display a corresponding one of a group of graphical representation of performance data, and so that they can be invoked on the same computer for monitoring.

In addition, a display process of either kind is composed so as to request the relaying process to transfer performance data, in response to instructing by a user after the display process has been invoked. Different display processes are prepared in correspondence to different graphical representation of data, so the structures of the display processes are rather simple. As a result, in the present embodiment, a user is required to invoke at least one display process, if he desires to have performance data to be displayed on a computer for monitoring. If he requests display of performance data for plural measurement items, he will be required to invoke plural display processes. In that case, the user selects display processes of the second kind, depending upon graphs he wants to use, and points out a measurement item to be displayed by each display process, after the display process is invoked.

In the invoked display process 16, the control routine 403 executes initialization for the display screen and initialization for connecting to the relaying process 15, and then the control is shifted to the connection routine 406, which issues a connection request to the relaying process 15 (step 562). When the relaying process 15 receives the connection request, the connection routine 303 in the relaying process generates the input/output buffer 301 and the request flag 302 in correspondence to the display process and executes connection to the display process (step 546). When connection with the display process completes, and data transfer therewith becomes possible, the relaying process 15 transmits the configuration definition of the parallel computer 1 received from the collecting process 3, to the display process 16 connected just now.

The display process 16 receives the configuration definition, and executes securing of the send/receive buffer 404 required to store performance data which will be transferred later on, and calculates the layout of a graph required to display performance data of all the nodes, based upon the received configuration definition. Then, the display process 16 displays a windows on the display device (step 563).

Figure 7:
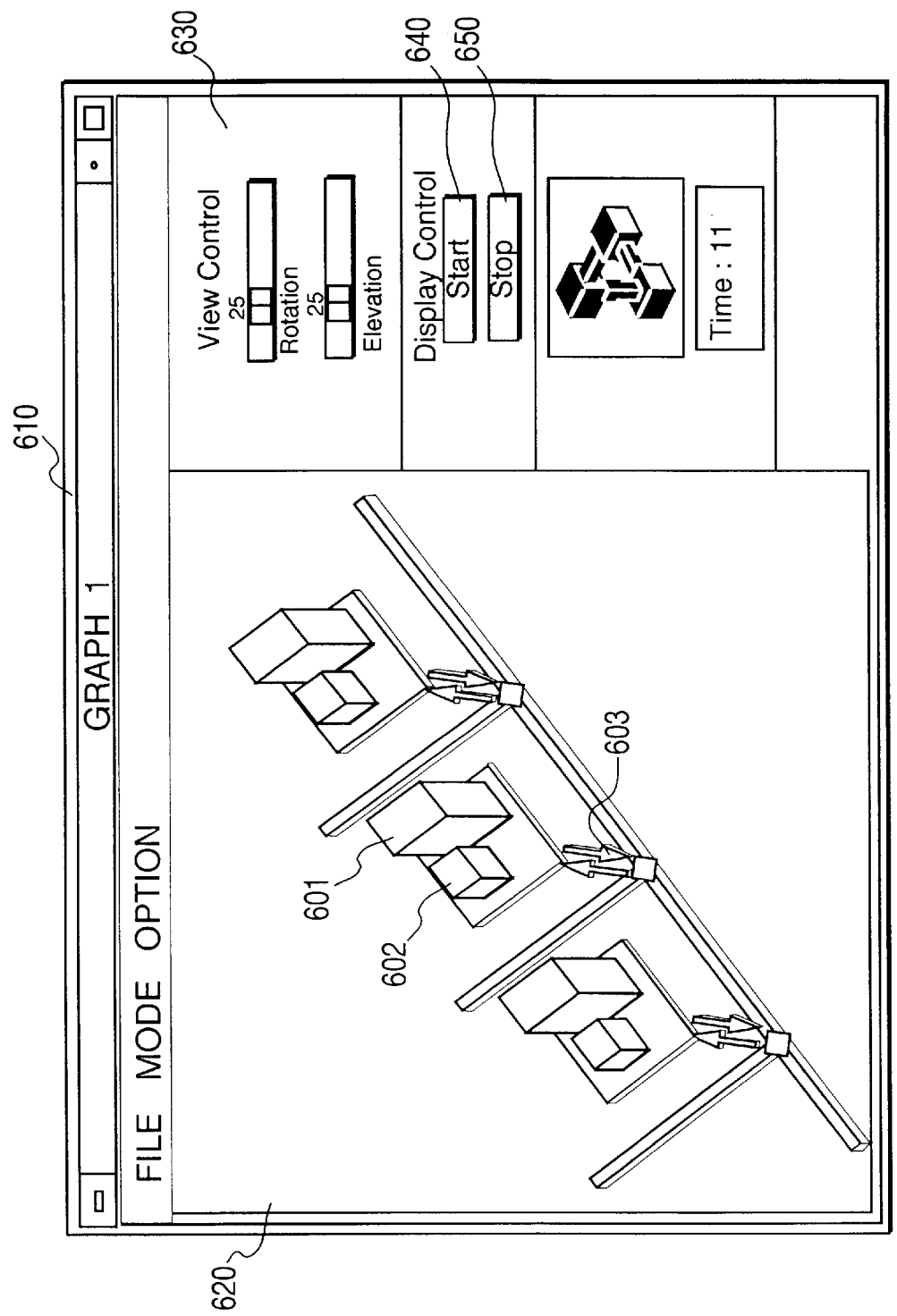
FIG. 7 shows one example of a display screen of performance data.

FIG. 7 shows an example of a window where performance data for plural measurement items predetermined for a display process (a display process of the first kind) is displayed. The activity of one node is shown by two boxes and a pair of two arrows (601, 602, 603). The overall activity of the entire parallel computer 1 is shown by arranging such graphical objects for each node in the parallel computer 1. The heights of two boxes 601, 602 correspond to the CPU utilization and the memory utilization ratio on one node, respectively. The lengths of the pair of two arrows 603 correspond to the transmission count and the receive count between the node and the network 21.

The display window 610 is composed of a display area 620 and a control area 630. The user controls the display process by using the objects such as the buttons 640, 650 arranged in the control areas 630. Data display is started when the button 640 is pushed, and the display is stopped when the button 650 is pushed.

FIG. 8 is an example of a window displayed by another display process (a display process of the second kind) which displays on one screen, performance data for one measurement item which a user selects. A bar graph is displayed in the display area 620. The horizontal axis 1711 of the bar graph corresponds to different nodes, and one performance data for one measurement item is mapped in the vertical axis 1712. A user selects a measurement item for which the user wants to be mapped to the vertical axis, from a list 1704 of measurement items given in the control area 630. The buttons 640, 650 are similar to the case of FIG. 7.

When the user requests start, of data display to a display process which uses the display window 610 or 1700 shown in FIG. 7 or FIG. 8, by pushing the button 640 in the display window 610 or 1700, the display process 16 transmits a message which requests transfer of performance data, to the relaying process 15 (step 564). As mentioned above, in the relaying process 15, the internal processing routine 308 issued the select system call, and the relaying process 15 is in the state of waiting for arrival of a message at the input/output buffer 301 or 304.

The select system call returns upon the arrival of the performance data transfer request message from the display process 16, and when the internal processing routine 308 detects the arrival of this message, it shifts the control to the input analysis routine 306. The input analysis routine 306 issues the receive system call and reads the request message into the input/output buffer 301 connected to the display process. Next, the output control routine 307 checks the identifier of the request message, confirms that the message is a performance data transfer request, and sets the request flag 302 accompanying the input/output buffer 301. When plural display processes 16 or plural logging processes 17 are invoked by the same user or by different users, the relaying process 15 repeats all the processing mentioned above for each connection to those processes.

The operation of the computer system after the display process 16 is connected to the relaying process 15 and the display is started by the user's screen operation will be explained below. The performance data is transferred from the capturing process 4 to the relaying process 15 by way of the collecting process 3, by the above-mentioned procedure (steps 504, 527, 548). At this time, the relaying process 15 is in the state of waiting for arrival of a message to the input/output buffer 301 or 305, after the select system call was issued by the internal processing routine 308. In response to arrival of the message containing the performance data from the collecting process 3, the select system call returns to the internal processing routine 308, and the internal processing routine 308 moves the control to the input analysis routine 306.

The input analysis routine 306 issues the receive system call and reads the message which has arrived into the input/output buffer 304. The routine 306 further checks the identifier of the message, confirms that the message is one which includes performance data, and returns the processing to the internal processing routine 308. The internal processing routine 308 checks the request flags 302 which accompany the input/output buffers 301 connected to the display processes 16 (step 547). If a request flag 302 accompanying one of the input/output buffers 301 is set, the internal processing routine 308 memory-copies the message which contains performance data from the input/output buffer 304 into the one input/output buffer 301, and calls the output control routine 307.

The output control routine 307 issues the send system call, transfers the above-mentioned message stored in the one input/output buffer 301 to the display process 16 connected to the one input/output buffer 301, and clears the request flag 302 which accompanies the one input/output buffer 301 (step 549). The relaying process 15 distributes the performance data to all the display processes 16 connected to the relaying process 15, by repeating the processing mentioned above to the request flags 302 provided for those display processes 16 connected. It is quite the same, when a logging process is connected to the input/output buffer 301.

Because the relaying process 15 on the monitoring computer 11 executes the processing for distributing data to two or more display processes 16, as was explained above, increase of the number of invoked display processes 16 does not influence on the capturing processes 4 and the collecting process 3 on the parallel computer 1, and the load of the parallel computer 1 of a monitoring target stays the same.

When the display process 16 receives the transferred performance data from the relaying process 15, the display process 15 makes a display screen, by referring to performance data for at least one measurement item necessary for the display, among all the received performance data, and draws the display screen on the input/output device 12 (step 566). In case of the display process 16 which has the window of FIG. 7, the performance data necessary for the display is performance data for three measurement items predetermined by the display process such as the CPU utilization, the memory utilization ratio and the communication count. In case of the display process 16 which has the window of FIG. 8, the performance data necessary for the display is performance data for one measurement item which a user requested the display process 16.

The display process 16 displays performance data sent thereto one after another, by repeating the display operation from steps 564 to 566. That is, the control routine 403 of the display process 16 transmits a data transfer request to the relaying process 15 (step 564). A concrete operation at that time will be explained later on. Thereafter, the control routine 403 shifts into a waiting state for detecting either of the window operation of a user and the arrival of the message which contains performance data from the relaying process. When the message which contains performance data arrives at the relaying process 15, the control routine 403 issues the receive system call, reads the message into the send/receive buffer 404 (step 565), and moves the control to the input analysis routine 401.

The input analysis routine 401 confirms that the identifier of the message sent from the relaying process 15 is an identifier of a message which contains performance data. Next, the input analysis routine 401 invokes the drawing processing routine 402 and the drawing processing routine 402 changes the height of the graph in the window according to the received performance data (step 566).

When the drawing ends, the processing returns to the control routine 403. The control routine 403 makes a performance data transfer request message for performance data of the next time step, into the send/receive buffer 404, issues the send system call, and transmits this message to the relaying process 15 (step 564). The control routine 403 returns to the above-mentioned waiting state again after this transmitting.

On the other hand, stop of the display is achieved by discontinuing transmission of the performance data transfer request message which is transmitted after drawing of the performance data for each time step. When the user pushes the button 605 in the display window 610, the control routine 403 goes out of the above-mentioned waiting state and moves the control to the input analysis routine 401. The input analysis routine 401 analyzes the request and informs the control routine 403 that the pushed button is the stop button 650. The control routine 403 does not transmit the performance data transfer request message to the relaying process 15, after this state is detected. The request flag 302 corresponding to the display process 16 which does not transfer a performance data transfer request message is not set. Therefore, the relaying process 15 does not transmit the performance data to such a display process 16. Therefore, the display of the display process 16 stops.

Termination of the display process 16 is executed by the menu operation of the display window 610. As with the stop processing, the control routine 403 detects the window operation of user for termination, goes out of the above-mentioned waiting state and moves the control to the input analysis routine 401. The input analysis routine 401 detects that a stop button is selected from the menu and informs the control routine 403 of the result of the detection. The control routine 403 forms a termination notification message in the send/receive buffer 404 and sends this message to the relaying process 15 by the send system call (step 567).

When the relaying process 15 receives the termination notification message, it disconnects the display process 16, and releases the input/output buffer 301 and the request flag 302 both allocated to the display process (step 550). When the connection is released, the display process 16 executes termination procedure (step 568), and quits (step 569).

If the connection to all the display processes 16 is closed, the system administrator can execute termination of the relaying process 15. In order to begin termination of the relaying process 15, it is necessary to input an interrupt signal to the relaying process 15, by using the interrupt function which is offered by OS controlling the computer 11 on which the relaying process 15 is invoked.

When the relaying process 15 receives the interrupt signal, it issues a termination request to the collecting process 3 (step 551). When the collecting process 3 receives the termination request, it issues termination requests to all the capturing processes 4 (step 528), and each capturing process 4 executes termination, when it receives the termination request (step 505). If the connection to all the capturing processes 4 is closed, the collecting process 3 releases the connection to the relaying process 15. Afterwards, the collecting process 3 and the relaying process 15 execute termination independently and all processes of the monitoring system will exit (step 529, 552).

Next, the method of storing performance data in a storage device 13 by the logging process 17 and displaying the stored data by the display process 16 will be explained. The logging process 17 shown in FIG. 5 is invoked by the user like the display process 16. The connection routine 455 issues a connection request to the relaying process 15, when the logging process 17 is invoked, connects to the relaying process 15 according to the same procedure as the display process 16 executed, and displays a control window (not shown in the figure) to enable a user to control the operation of the logging process 17. The display window is similar to the display window, for instance, 610 (FIG. 7) of the display process 16, and comprises the control area 630 but not the display area 620.

What the user can control by the control area 630 is selection of measurement items of performance data items to be stored, designation of the name of a file which stores the performance data, and indication of the start and end timings of the storing operation. When the user indicates start of data logging after he specifies measurement items for performance data to be stored and the file name which stores the data by the operation on control area, the logging process 17 receives performance data just like the display process 16. The input analysis routine 451 confirms that the identifier of a message sent from the relaying process 15 is an identifier for a message which contains performance data.

This performance data is stored in the send/receive buffer 452, and afterwards, this performance data is reformatted into the form of log data, by the data reformat routine 153 and is stored in the storage device 13 such as a magnetic disk storage device, etc., by the output routine 454.

Figure 9A:
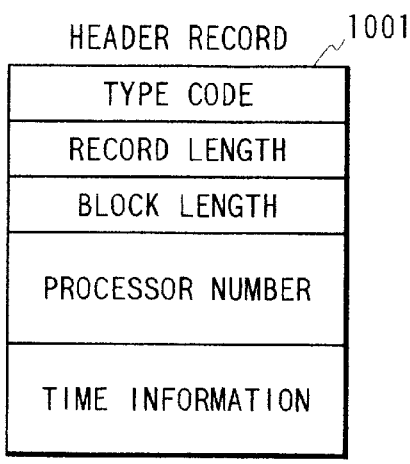
FIG. 9A shows an example of the form of a header record in a block which a logging process stores in a storage device.
Figure 9B:
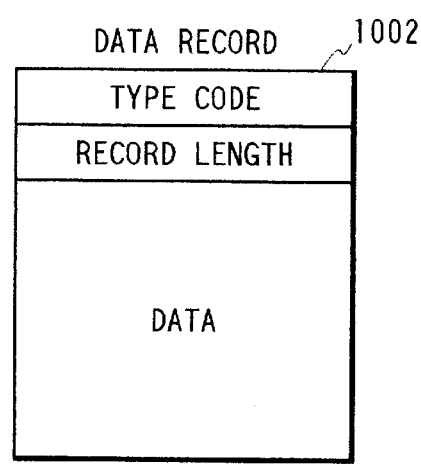
FIG. 9B shows an example of the form of a usual data record in the block which the logging process stores in the storage device.
Figure 9C:
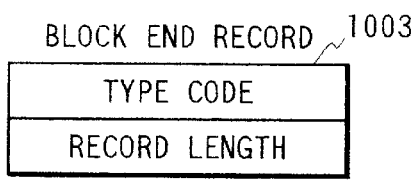
FIG. 9C shows an example of the form of a block end record in the block which the logging process stores in the storage device.
Figure 9D:
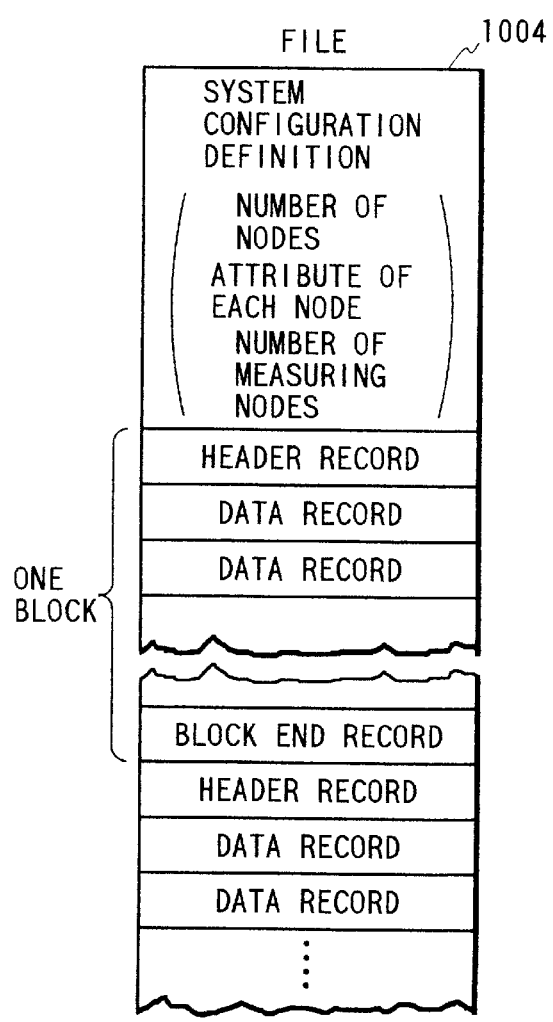
FIG. 9D shows an example of the form of a file which the logging process stores in the storage device.

As shown in FIG. 9D, the log file 1004 first stores the configuration definition of the parallel computer 1 such as the total number of nodes of the parallel computer 1, the attribute of each node, and the list of nodes which measured the performance data. After that information, blocks are stored. Each block corresponds to one of the nodes and one of the time steps. Each block is composed of plural data records which hold performance data captured different measurement items for the same node at the same step.

The header record 1001 shown in FIG. 9A and the block end record 1003 shown in FIG. 9B are placed respectively at the beginning and end of each block. These records show the boundaries of the block. The header record includes the block length which shows the length of the entire block, the list of node numbers of nodes which measured the performance data included in the data records in the block, and time information indicative of the time step at which the performance data included in the data records was measured. In addition, at the head of every record, there is the type code by which the kind of the record is shown and the record length which shows the length of the record.

The order of arrangement of the blocks is that a block corresponding to one node and one time step is first stored, and other blocks corresponding to other nodes and the same time step are stored next. After all blocks for all nodes for the time step are stored, then blocks for the subsequent time steps are stored. The performance data thus stored by the logging process 17 can be displayed by a display process 16. The display process used for the display may be one which has already been invoked and is in use for displaying the performance data in the display window shown in FIG. 7 or FIG. 8, or the display process may be one which has not been invoked yet.

Figure 10:
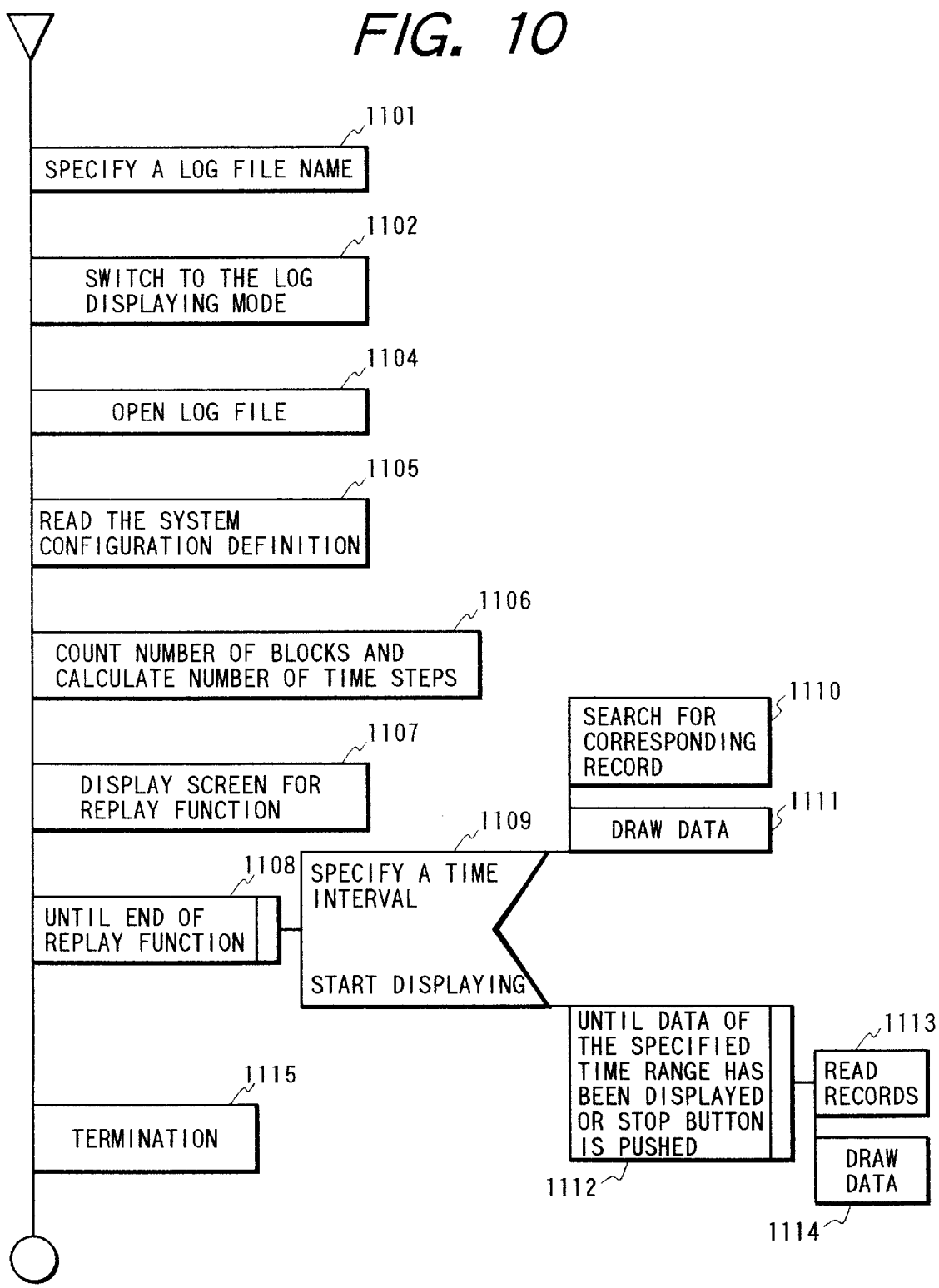
FIG. 10 is a flow chart of the re-display processing procedure of the stored data.

The case will be explained below where a display process already invoked is used to display the performance data is used. The flow chart of FIG. 10 shows the procedure for displaying the stored data by the display process 16 after it reads the stored data. First of all, a user operates the input/output device 12 to input the file name of a file where the stored data which should be displayed is stored.

When the user then inputs the request to the display process 16, for switch to the stored data display mode, the display process 16 switches to the stored data display mode (step 1102). At this time, the display process 16 stops transmission of the performance data transfer request to the relaying process 15, and the input source switch routine 405 (FIG. 5) switches its data input source from the relaying process 15 to the specified file on the storage device 13.

When the display process 16 opens this file (step 1104), the display process 16 reads the configuration definition of the parallel computer 1 held at the head of the file (step 1105). The display process 16 saves the configuration definition which it has used until that time into the buffer (not shown), calculates the layout of a graph based on the configuration definition newly read from the file, and display the graph on the display screen.

Next, the display process 16 reads the file until its end, counts a total number of blocks included in the file, and divides this number of blocks with the number of nodes included in the configuration definition newly read, to calculate a total number of time steps at which the stored blocks were measured (step 1106) Next, a control screen of the log data display function is displayed (step 1107).

Figure 11:
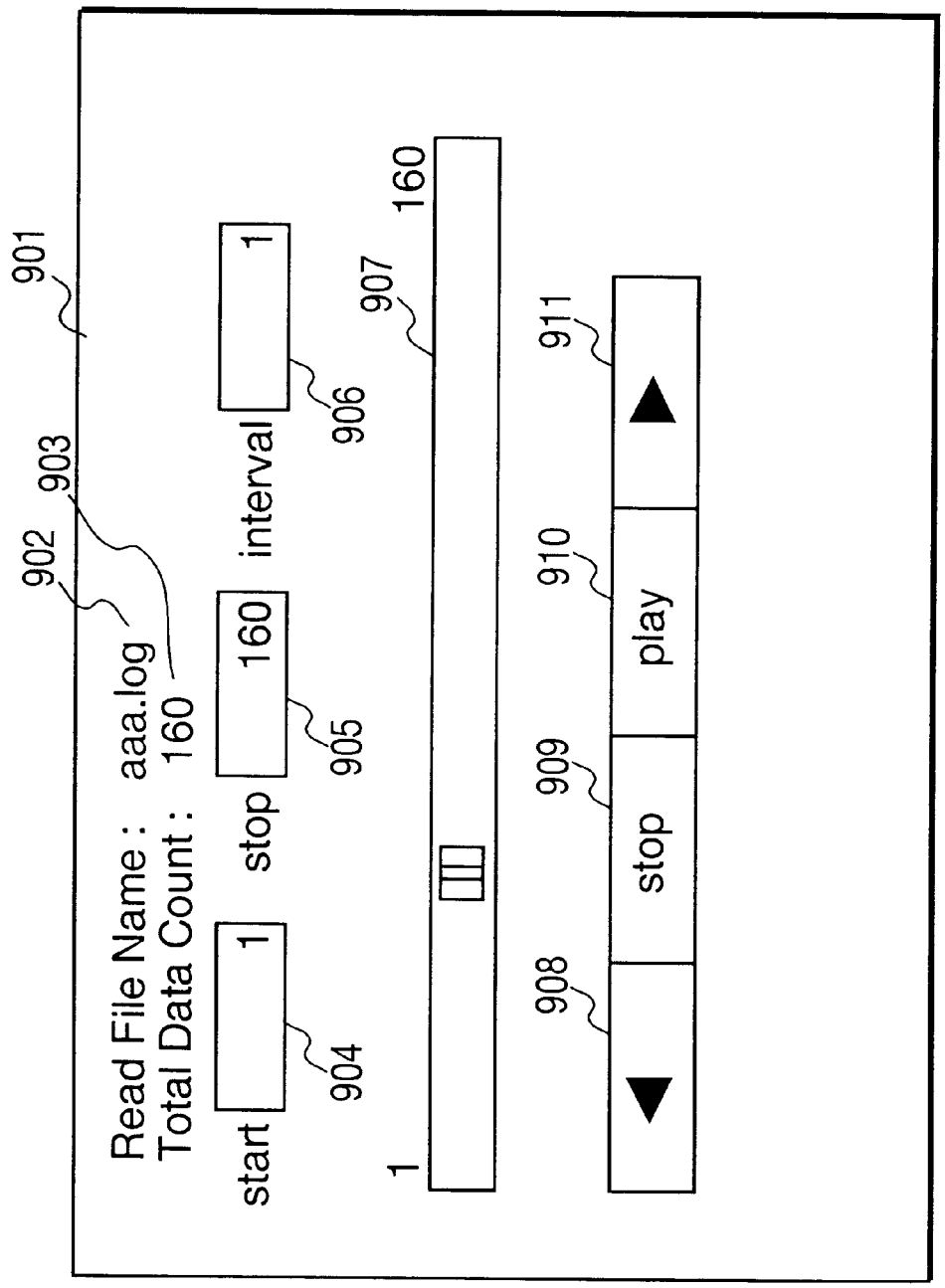
FIG. 11 shows an example of a control screen to control the display function of the stored log data.

FIG. 11 is one example of the control screen. The file name read now is displayed in the file name display field 902 and the number of time steps of the log data calculated in the processing block 1106 is displayed in the data count display field 903. The start and end of the range of the time steps to be displayed and the number of time steps to be skipped are respectively inputted in the display range input field 904, 905, and 906. The slider 907 shows the time steps of the data being displayed now, and movement of the slider 907 can change the data displayed. The buttons 908, 909, 910, 911 are respectively ones for designating the single frame step to a preceding time step frame, stop of continuous display, start of continuous display, and a single frame step to a succeeding time step frame.

When a user specifies the display time, that is, the time step of data to be displayed by using such a control screen 901 in step 1109, the display process 16 reads the content of the file and retrieves the data of the corresponding time step (step 1110). And, the data is drawn on the display device (step 1111).

If the continuous display is started by pushing the button 910 of the control screen 901 in step 1109, it is repeated to read the data for the one time step succeeding to the data already read (step 1113) and to display it (step 1114), until the last time step of the display range specified by the display range input field 905 is reached or stop of the continuous display is specified by the display button 909 (step 1112).

As for the time interval by which the display is repeated, it is possible to adopt the method which calculates it from the time information in the header record 1001 stored in the file or the method of specifying it beforehand, etc., but even if any of these methods is adopted, time is measured by the clock generating routine 407 in the display process 16 in FIG. 5 and the drawing processing is executed when the specified time passes.

When the end of log data display function is ordered from the input device of the mouse, etc., by the user (step 1108), termination is executed (step 1115), and the input source switch routine 405 switches its input source to the relaying process 15. As a result, the display process 16 returns to a usual data display mode. At this time, the display process 16 discards the configuration definition read from the file, revives the configuration definition saved into the buffer (not shown), and returns the graph on the display area to the state of a real-time display displayed before the display is switched to the log data display mode.

As a result, if both the logging process 17 and the display process 16 are invoked at the same, it is possible to display the past data during the present data is displayed in real time. Moreover, it is possible to perform a postmortem analysis of the operation status of the parallel computer 1, by using the log data stored beforehand. It is possible to invoke the logging processes 17 concurrently on plural monitoring computers 11, so that those logging processes concurrently store the performance data in the storage device 13 included in those monitoring computers.

In addition, the logging process 17 is not especially distinguished from the display process 16, if seen from the relaying process 15. Therefore, the fact that two or more display processes 16 can be invoked to one display process means that two or more logging processes 17 can be invoked to the one relaying process 15. Therefore, two or more users can concurrently use the data logging function by invoking different logging processes 17 concurrently, but the concurrent invocation of those logging processes does not increase the load on the parallel computer.

EMBODIMENT 2

The present invention can be applied also to a parallel computer different from one used in the first embodiment. In above-mentioned embodiment, only a specific node in the parallel computer is connected to the external network. However, there is one which includes plural specific nodes connected to this external network, among the parallel computers which have already been developed. With such a parallel computer. It is possible to provide collecting processes respectively on those specific nodes and to have the collection of the performance data and the transfer of the data to the relaying process be shared by those two or more collecting processes.

That is, the communication between the relaying process and the collecting process invoked on each specific node is used, so that the collecting process requests part of the plural nodes including the specific node to collect performance data, and transfer those performance data captured by them to the relaying process.

The load of each specific node in this second embodiment is lower than the load of the one specific node used in the first embodiment where the one specific node collects performance data from all nodes. Even in such a parallel computer, the load on the parallel computer does not increase, when two or more users try to monitor performance data of the parallel computer concurrently.

EMBODIMENT 3

Nodes of another parallel computer which has already been developed are divided into plural partitions each containing two or more nodes. In this case, each partition can execute one job by two or more nodes in that partition, in parallel to other partitions. Of course, it is possible to make two or more jobs be executed in each partition. However, that parallel computer is suitable for one user's occupying one partition. It is effective in such a parallel computer to monitor the operation situation of each partition separately from other partitions.

Figure 13:
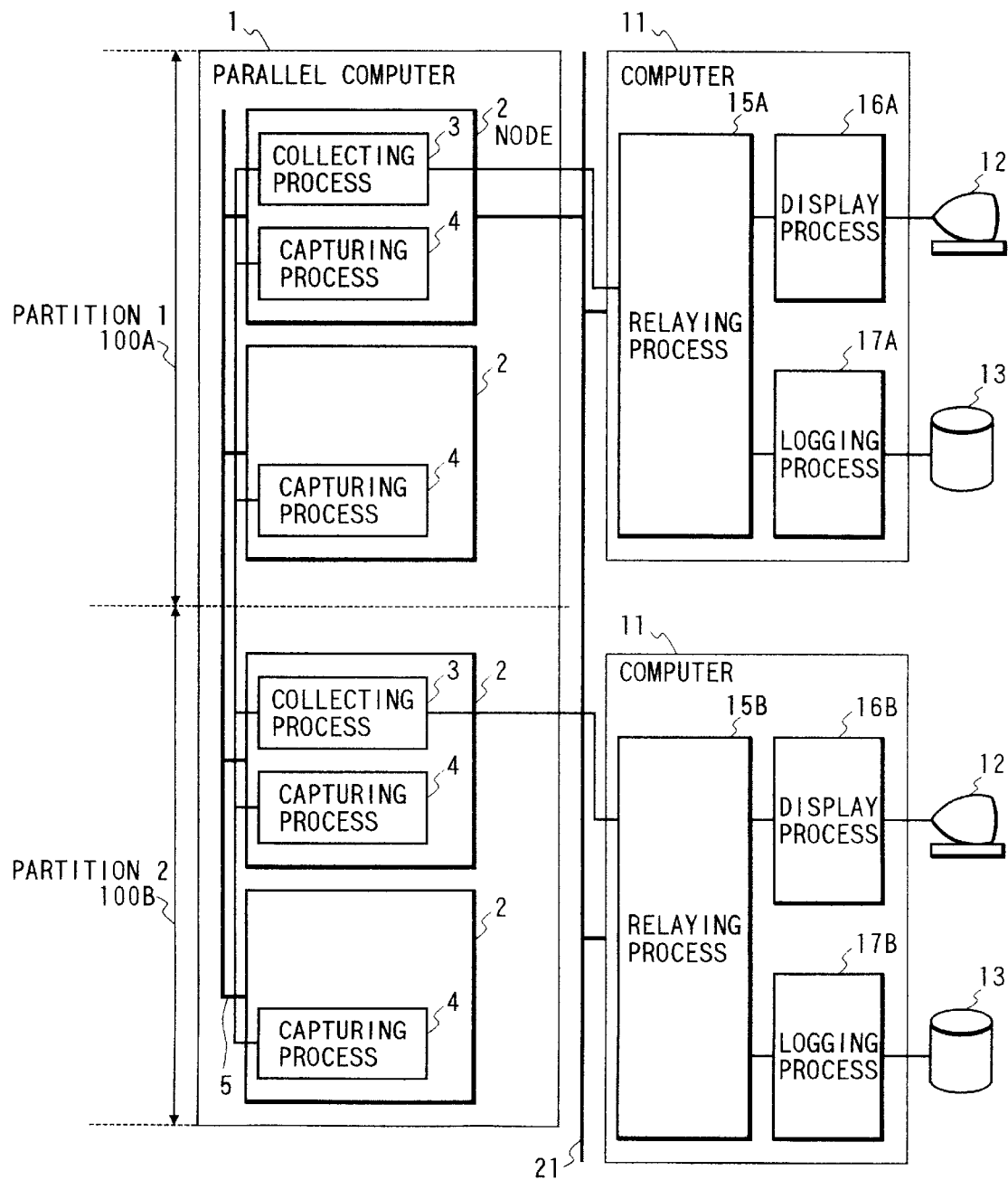
FIG. 13 is a schematic diagram of another parallel computer to which the performance monitoring method by the present invention is applied.

In FIG. 13, for example, the parallel computer 1 is divided into the partition 1 and the partition 2 (100A, 100B). Among two or more nodes included in each partition, a predetermined one node is connected to the external network 21. The capturing process 4 is invoked on each node and the collecting process 3 is invoked on a specific node in each partition connected to the external network 21. The first relaying process 15A is invoked on the first monitoring computer 11 to monitor performance data of the partition 1 and communicates with the collecting process 3 invoked on the specific node of the first partition.

In addition, the display process 16A or the logging process 17A is invoked on the first monitoring computer 11 and is connected with the first relaying process 15A. As in the first embodiment 1, the display process 16A or the logging process 17A receives the distribution of performance data of the partition 1 from the first relaying process 15A.

In addition, when another display process or another logging process not shown in the figure is invoked by other computers not shown in the figure, that another display process or logging process also receives the distribution of the performance data through the first relaying process 15A. The second relaying process 15B and the display process 16B or the logging process 17B, and another display process or logging process not shown in the figure are further invoked concerning the other partition 2, in the same way.

In this embodiment, performance data of each partition can be captured independently of the other partition. In addition, the load of the parallel computer 1 still does not increase even when both a display process and a logging process which monitor the performance data of the same partition are invoked on the same monitoring computer or when two or more display processes which monitor the performance data of the same partition are invoked on different monitoring computers.

EMBODIMENT 4

The most extreme case of the embodiment 2 is one in which all nodes of a parallel computer are connected with the external network. In this case, a process is invoked which has both the function of the capturing process and the function of the collecting process concurrently on each node, and the relaying process communicates with and receives performance data of each node from this process invoked on that node. In this case, the same process for capturing performance data is invoked on each node, imbalance of the load among the nodes of the parallel computer is smaller than that of embodiment 1.

EMBODIMENT 5

The present invention can be similarly applied to the distributed computer system composed of two or more computers connected to the external network. In this case, the capturing process is invoked on each of the computers which belong to this distributed system. The collecting process is invoked on one of the computers, such as the computer which controls the network, for instance. The relaying process is invoked on one of plural computers which become monitoring targets, among the computers belonging to the distributed system. The display process or the logging process is invoked on one of the computers for monitoring targets or on one of the other computers of the distributed system different from those computers for monitoring targets. It is possible to invoke the relaying process on one computer different from the computers for monitoring targets.

As a result, the communication between each capturing process and the collecting process and the communication between the collecting process and the relaying process are executed through the external network, unlike the embodiment 1. It is the same, however, as the embodiment 1 that two or more display processes or logging processes can receive the distribution of the performance data from the relaying process.

MODIFICATIONS

The present invention is not limited to the embodiments shown above but includes various; modifications including those to be illustrated below.

(1) Use of the high-speed internal communication procedure in the parallel computer It was assumed in the embodiments above that the communication by TCP/IP was used in the communication within the parallel computer, that is, at transfer of performance data from the capturing process 4 to the collecting process 3. There are many parallel computers in which plural data are transferred in parallel to each other by way of different paths in the internal network. The internal communication procedure lighter and with more high-speed than TCP/IP is often adopted in the communication between nodes through the internal network. In such a computer, it is effective to use the high-speed internal communication protocol to the internode-communication, from a view point of the speed-up of the transferring of performance data, when the method of transferring performance data captured by various nodes to the collecting process invoked on one or part of the nodes of the parallel computer is adopted as shown in the embodiments 1, 2 and 3.

Figure 3:
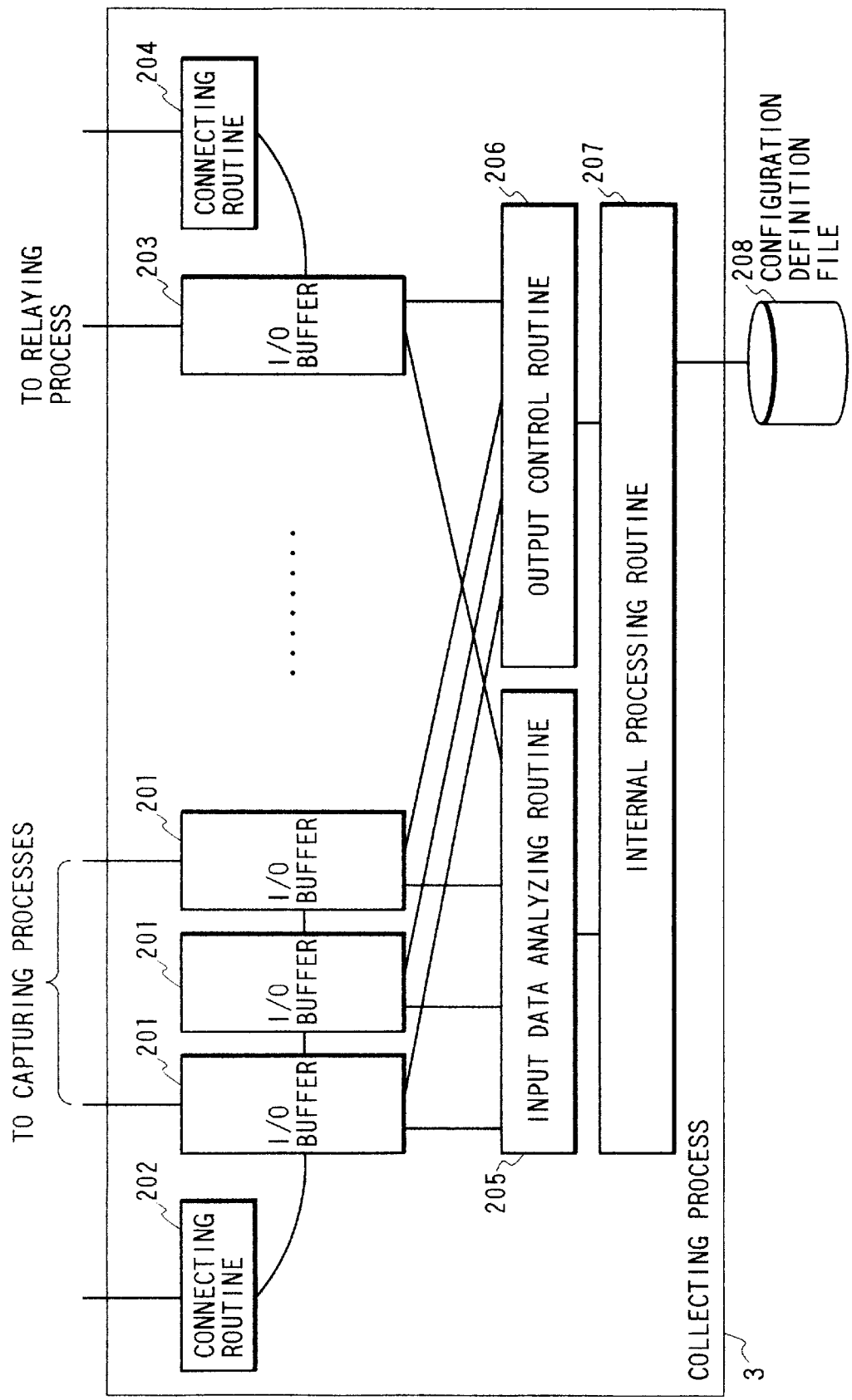
FIG. 3 is a module diagram of a collecting process in the parallel computer performance monitoring system of FIG. 1.
Figure 4:
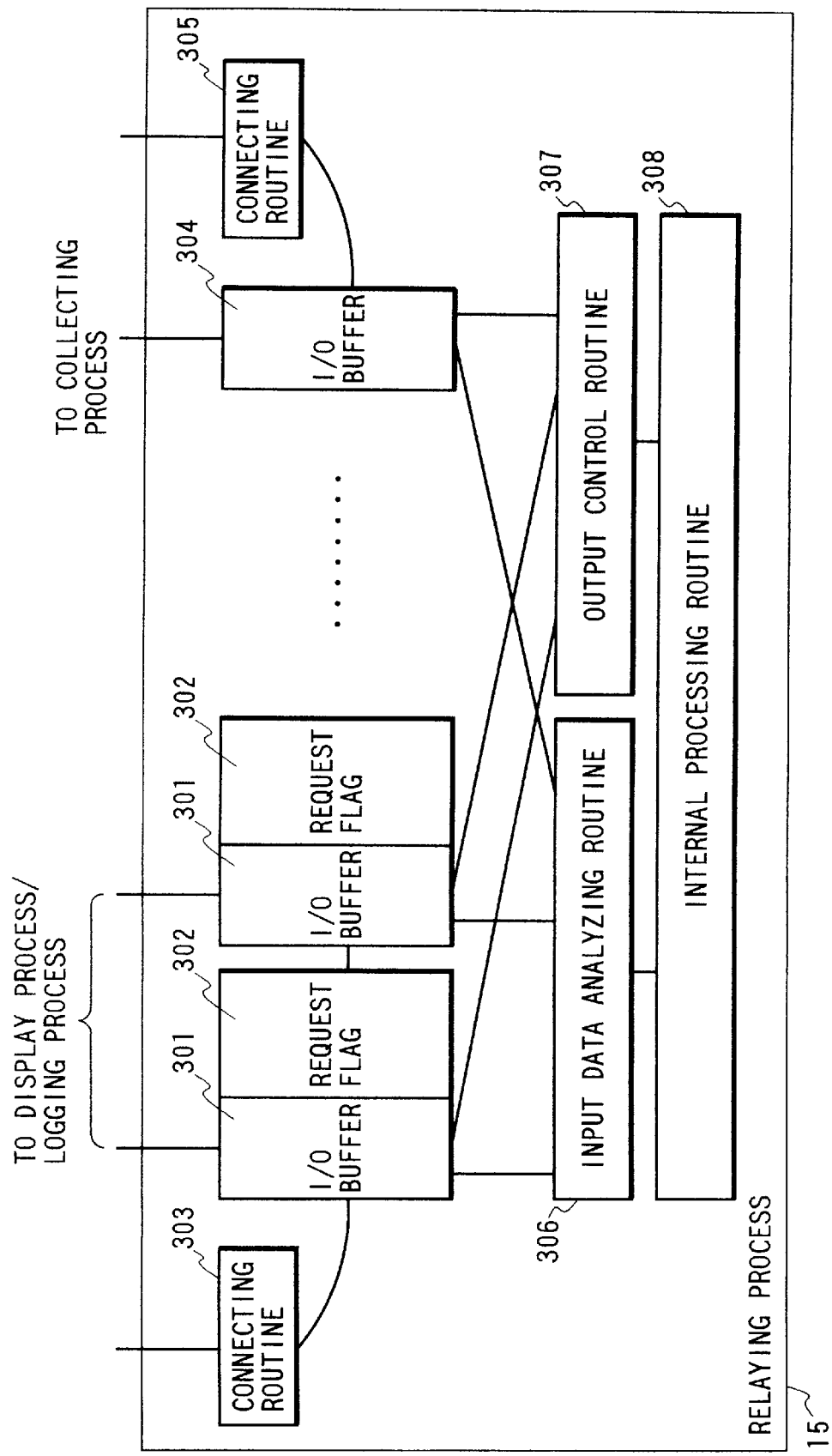
FIG. 4 is a module diagram of a relaying process in the parallel computer performance monitoring system of FIG. 1.

In this case, in the collecting process 3 shown in FIG. 3, the input analysis routine 205 and the output control routine 205 are replaced by a pair of the input analysis routine and the output control routine both adapted to the internal communication protocol and a pair of the input analysis routine and the output control routine both adapted to the external communication protocol. These two pairs are used selectively, depending upon the communication to be executed is the internal communication or the external communication. The input/output buffer 201 and 203 are respectively used by the first and second pairs.

For example, the data which has been transferred from the capturing process 4 to the input/output buffer 201 by the internal communication procedure is received by the input analysis routine adapted to the internal communication and is passed to the internal processing routine 207. The internal processing routine 207 calls the output control routine 206 to communicate with the relaying process 15 and transfers the data to the routine 206. The output control routine 206 transmits the data to the relaying process 15 by a protocol such as TCP/IP which enables communication with the monitoring computer 11.

According to the present modification, it is possible to decrease the load on the parallel computer 1 than the case where all nodes of the parallel computer use the external communication protocol with a comparatively heavy load such as TCP/IP becomes possible.

(2) Designation of items to be captured from the relaying process

In the embodiment 1, the measurement items which the capturing process captures are decided beforehand but these items can be specified from the relaying process. To realize this, the system administrator inputs information which specifies these items into the computer 11, when the system administrator invokes the relaying process on this computer.

(3) Selection by the relaying process, of part of the measurement items of the captured performance data In the embodiment 1, the performance data for plural measurement items (for instance, the CPU utilization, the memory utilization ratio, the magnetic disk storage device access frequency, and communication count) captured by the capturing process are always transferred to the display process 16 by way of the collecting process 3 and the relaying process 15. If the relaying process 15 selects performance data for measurement items necessary for the display by the display process and transfers them to the display process 16, the transferred amount of data can be decreased. To realize this operation, the display process 16 notifies the relaying process 15 of performance data which the display process 16 should display, immediately after the display process is invoked by a user and the connection is established with the relaying process 15 (step 562 (FIG. 6B)).

The relaying process 15 stores the measurement items which each display process needs. When the internal processing routine 308 in the relaying process 15 memory-copies the performance data received from the collecting process and held in the input/output buffer 304 into the input/output buffer 301 connected to the display process, not all the received performance data is copied but only performance data for measurement items stored for the display process are selectively copied.

(4) Selective capturing of performance data for selected measurement items

In the embodiment 1, the relaying process requests the collecting process, independently of the invocation of the display process or the logging process, to collect performance data. However, it is possible to make the relaying process, so that it issues this request after either of the display process or the logging process is invoked.

In that case, the display process or the logging process notifies the relaying process of the measurement items which a user has requested, and the relaying process requests the collecting step of the computer of monitoring target to capture performance data for measurement items which those processes have notified.

It is desirable to renew the measurement items which the relaying process requests the collecting step, when another display process or another logging process is newly invoked, so that measurement items which the process newly invoked requests should be add to the requested measurement items. According to this method, the amount of performance data to be captured decreases because only necessary performance data are captured.

(5) Batch transmission of performance data captured for plural time steps

In the embodiment 1, performance data is transmitted from the capturing process 4 to the display process 16 every time step at which the data is captured, but it is possible to transmit the performance data captured at plural time steps are transmitted at a time. The modification will be explained below.

Figure 2:
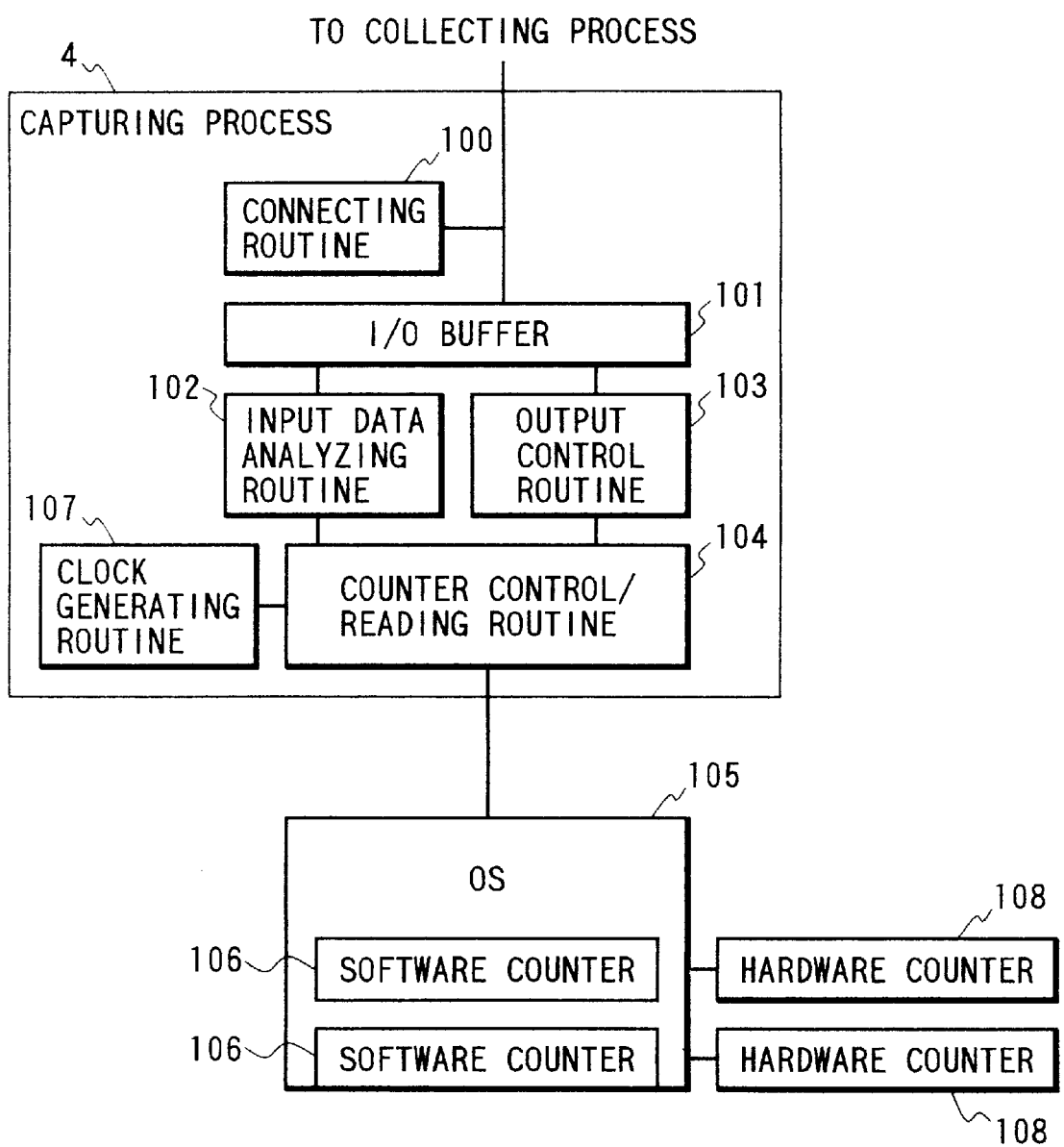
FIG. 2 is a module diagram of a capturing process in the parallel computer performance monitoring system of FIG. 1.

In FIG. 2, when the output control routine 103 of the capturing process 4 receives data from the counter control/reading routine 104, the routine 103 stores the data at the tail at that time in the input/output buffer 101, and stores the total number of records stored in the input/output buffer 101. When the number of records in the input/output buffer 101 reaches a predetermined value, the output control routine 103 transmits the data stored therein so far to the collecting process 3 as one data. The collecting process 3 and the relaying process 15 executes operations similar to those in the embodiment 1.

In FIG. 5, when the display process 16 receives this data, it reads and displays the data for one time step from the data in the send/receive buffer 404 at regular intervals, by referring to the clock generating routine 407. When the display process 16 finishes processing all the data in the send/receive buffer 404, it transmits a data request to the relaying process 15. With respect to the logging process 17, there is no change in its operation and it stores the data like the embodiment 1. As a result, it is possible to reduce the transfer count of the captured data and to decrease the communication load.

According to the present invention, the load of the computer of monitoring target does not almost increase, even if the number of processes (the display process or the logging process) which use performance data captured by the computer of monitoring target increases.

What is claimed is:

1. In a computer network having a plurality of computers which include a computer system of monitoring target, and a computer connection network for connecting said plurality of computers, a computer system monitoring method comprising the steps of:

receiving, by a relaying process, performance data of said computer system of monitoring target, by way of said computer connection network, each time when said computer system of monitoring target captures performance data thereof repeatedly at different timings, wherein said relaying process is invoked on one of said plurality of computers other than said computer system of monitoring target; and transferring said received performance data to each of a plurality of utilizing processes by said relaying process, wherein said plurality of utilizing processes are invoked on a plurality of computers each of which is the same as or different from said one computer on which said relaying process is invoked, among said plurality of computers included in said computer network other than said computer system of monitoring target.

2. A computer system monitoring method according to claim 1, wherein said plurality of utilizing processes include a plurality of display processes, each display process displaying said performance data transferred to said each display process on a display device connected to one of said plurality of computers on which said each displaying process is invoked.

3. A computer system monitoring method according to claim 2, wherein said performance data includes performance data for a plurality of measurement items;

wherein said method further comprises a step of displaying, by each display process, part of said performance data transferred to said each display process corresponding to part of said plurality of measurement items, on said display device connected to one of said plurality of computers on which said each display process is invoked.

4. A computer system monitoring method according to claim 3, further comprising a step of receiving, by said relaying process, a transfer request of said performance data sent from each display process;

wherein said transferring step of said performance data by said relaying process to said each display process is executed in response to said transfer request sent from said each display process.

5. A computer system monitoring method according to claim 4, wherein said transferring step of said performance data by said relaying process to each display process includes the steps of:

judging, by said relaying process, whether there is a display process which has already sent a transfer request of performance data to said relaying process, whenever said relaying process receives performance data from said computer system of monitoring target;

transferring, by said relaying process, said received performance data to one of said plurality of display processes, when said one display process has been detected as one which has already sent a transfer request of said performance data to said relaying process; and transferring said received performance data to each of said plurality of display processes when said plurality of display processes have been detected as ones which have already sent a transfer request of said performance data to said relaying process.

6. A computer system monitoring method according to claim 4, wherein said part of said plurality of measurement items performance data for which is displayed by each display process includes ones which a user of said each display process has selected.

7. A computer system monitoring method according to claim 4, wherein said part of said plurality of measurement items performance data for which is displayed by each display process includes ones predetermined for each display process.

8. A computer system monitoring method according to claim 3, wherein said part of said plurality of measurement items performance data for which is displayed by each display process includes ones which a user of said each display process has selected.

9. A computer system monitoring method according to claim 3, wherein said part of said plurality of measurement items performance data for which is displayed by each display process includes ones predetermined for each display process.

10. A computer system monitoring method according to claim 2, wherein said transferring step of said performance data by said relaying process to each display process includes the steps of:

receiving, by said relaying process, a transfer request which requests transferring of part of performance data corresponding to part of said plurality of measurement items, as sent from one of said plurality of display processes:

selecting, by said relaying process, said part of said performance data corresponding to said part of said measurement items requested by said transfer request sent by said one display process, whenever said relaying process receives performance data from said computer system of monitoring target; and transferring, by said relaying process, said selected part of said performance data to said one display process.

11. A computer system monitoring method according to claim 2, further comprising a step of transferring, by said relaying process, a transfer request of performance data to said computer system of monitoring target;

wherein said receiving step includes a step of receiving performance data sent by said computer system of monitoring target, after transferring said transfer request of performance data thereto.

12. A computer system monitoring method according to claim 11, wherein said, transferring step of said transfer request of said performance data to said computer system of monitoring target is executed without depending on whether one of said plurality of display processes is already invoked.

13. A computer system monitoring method according to claim 11, wherein said transferring step of said transfer request of said performance data to said computer system of monitoring target is executed after at least one of said plurality of display processes has been invoked.

14. A computer system monitoring method according to claim 2, further comprising a step of notifying by said relaying process, said computer system of monitoring target of a plurality of measurement items performance data for which said computer system of monitoring target should capture, before one of said plurality of display processes is invoked.

15. A computer system monitoring method according to claim 14, further comprising a step of inputting, by an operator, information for deciding said plurality of measurement items to be notified to said computer system of monitoring target, into said one computer on which said relaying process is invoked;

wherein said notifying step is executed depending upon on said inputted information.

16. A computer system monitoring method according to claim 2, further comprising the steps of:

receiving, by said relaying process, a transfer request which specifies a plurality of measurements items performance data for which said computer of monitoring target should capture, sent from one of said plurality of display processes when said one display process is invoked; and requesting, by said relaying process, said computer system of monitoring target to capture performance data for said plurality of measurement items specified by said received transfer request.

17. A computer system monitoring method according to claim 1, wherein said computer system of monitoring target comprises a plurality of nodes each including at least one processor, and at least one of said plurality of nodes is connected to said computer connection network;

wherein a capturing process invoked on each node captures performance data of said each node, and a collecting process invoked on said one node collects said performance data which said capturing process invoked on each node has captured; and wherein said receiving step includes a step of receiving performance data of said plurality of nodes from said one node.

18. A computer system monitoring method according to claim 17, wherein said computer system of monitoring target further has an internal network different from said computer connection network for connecting said plurality of nodes;

wherein said performance data captured by said capturing process invoked on each node is transferred through said internal network to said collecting process.

19. A computer system monitoring method according to claim 18, wherein said performance data captured by said capturing process invoked on each node is transferred from said capturing process of said each node to said collecting process by way of said internal network and according to internal communication procedure; and wherein said internal communication procedure is different from communication procedure provided for said computer connection network.

20. A computer system monitoring method according to claim 17, wherein said plurality of nodes of said computer system of monitoring target are divided into a plurality of partitions and at least one node in a plurality of nodes included in each partition is connected to said computer connection network;

wherein said computer system of monitoring target is programmed so that a capturing process invoked on each node captures performance data of said each node, and a collecting process invoked on said one node within each partition collects said performance data which said capturing process invoked on each node within said each partition has captured; and wherein said receiving step includes a step of receiving performance data of one of a plurality of partitions, from said one node included in said one partition.

21. A computer system monitoring method according to claim 20, further comprising the steps of:

invoking another relaying process on one of said plurality of computers, to receive performance data of another one of said plurality of partitions;

invoking each of other plurality of display processes on one of said plurality of computers, to display said performance data of said another partition;

receiving, by said another relaying process, said performance data of said another partition;

transferring, by said another relaying process, said received performance data of said another partition to a plurality of other utilizing processes; and wherein said plurality of other utilizing processes are ones to be invoked on mutually different computers connected to said computer connection network, so as to utilize performance data of said computer system of monitoring target.

22. A computer system monitoring method according to claim 1, wherein said computer system of monitoring target is a distributed computer system which comprises plural computers selected from said plurality of computers included in said computer network;

wherein a capturing process is invoked on each of said plural computers selected so as to capture performance data of said each computer;

wherein a collecting process is invoked on one of said plurality of computers included in said computer network, and collects, by way of said computer connection network, performance data captured by said capturing process invoked on each of said plural computers selected; and wherein said receiving step comprises a step of receiving a plurality of performance data each for one of said plural computers selected, by way of said computer connection network from said collecting process invoked on said one of said plurality of computers included in said computer network.

23. A computer system monitoring method according to claim 1, wherein said computer system of monitoring target is a computer system which comprises a plurality of nodes, each node is connected to said computer connection network, and each of said plurality node comprises at least one processor;

wherein a capturing process is invoked on each node so as to capture performance data of said each node; and wherein said receiving step comprises a step of receiving a plurality of performance data each for one of said plurality of nodes, each from said each node by way of said computer connection network.

24. A computer system monitoring method according to claim 1, wherein said computer system of monitoring target comprises a plurality of processors and at least one processor connected to said computer connection network and to said plurality of processors;

wherein said computer system of monitoring target is programmed so that a capturing process invoked on each processor of said computer system of monitoring target captures performance data of said each processor, and a collecting process invoked on said one processor of said computer system of monitoring target collects said performance data which said capturing process invoked on each processor node has captured; and wherein said receiving step includes a step of receiving a plurality of performance data of said plurality of processors of said computer system of monitoring target from said one processor of said computer system of monitoring target by way of said computer connection network.

25. A computer system monitoring method according to claim 1, wherein said plurality of utilizing process comprises a plurality of logging processes, and each logging process stores said performance data in a storage device connected to one of said plurality of computers on which said each utilizing process is invoked.

26. A computer, comprising:

a computer system of monitoring target connected to a computer connection network;

at least one computer connected to said computer connection network; and a relaying process invoked on said one computer;

wherein said relaying process is programmed so as to receive performance data of said computer system of monitoring target therefrom, by way of said computer connection network, whenever said performance data of the computer system of monitoring target is captured repeatedly thereby, and transfers said received performance data to each of a plurality of utilizing processes by way of said computer connection network; and wherein said plurality of utilizing processes are ones to be invoked on mutually different computers connected to said computer connection network, so as to utilize performance data of said computer system of monitoring target.

27. A program storage medium which stores a relaying program which is to be invoked on one of a plurality of computers connected to a computer connection network;

wherein said relaying program is programmed so as to receive performance data from a computer system of monitoring target, each time when said computer system of monitoring target captures performance data thereof repeatedly at a plurality of timings, and transfers said received performance data to each of a plurality of utilizing processes to be invoked on mutually different ones of said plurality of computers, so as to utilize performance data of said computer system of monitoring target.

28. A computer system according to claim 26, wherein said computer system of monitoring target comprises a plurality of nodes each including at least one processor, and at least one of said plurality of nodes is connected to said computer connection network;

wherein a capturing process invoked on each node captures performance data of said each node, and a collecting process invoked on said one node collects said performance data which said capturing process invoked on each node has captured; and wherein said relaying process is programmed so as to execute receive operation, in such a manner that said relaying process receives said performance data of said plurality of nodes from said one node.

29. A computer system according to claim 28, wherein said computer system of monitoring target further has an internal network different from said computer connection network for connecting said plurality of nodes; and wherein said performance data captured by said capturing process invoked on each node is transferred through said internal network to said collecting process.

30. A computer system according to claim 29, wherein said performance data captured by said capturing process invoked on each node is transferred from said capturing process of said each node to said collecting process by way of said internal network and according to an internal communication procedure; and wherein said internal communication procedure is different from a communication procedure provided for said computer connection network.

31. A computer system according to claim 28, wherein said plurality of nodes of said computer system of monitoring target are divided into a plurality of partitions and at least one node in a plurality of nodes included in each partition is connected to said computer connection network;

wherein said computer system of monitoring target is programmed so that a capturing process invoked on each node captures performance data of said each node, and a collecting process invoked on said one node within each partition collects said performance data which said capturing process invoked on each node within said each partition has captured; and wherein said relaying process is programmed so as to execute receive operation in such a manner that said relaying process receives performance data of one of a plurality of partitions, from said one node included in said one partition.

32. A computer system according to claim 31, further comprising:

another computer connected to said computer connection network; and another relaying process invoked on said another computer, so to receive performance data of another of said plurality of partitions;

wherein said another receiving is programmed so as to receive performance data of said another partition, from said one node included in said another partition;

wherein said another relaying process is further programmed so as to transfer said received performance data to each of a plurality of other utilizing processes by way of said computer connection network; and wherein said plurality of other utilizing processes are ones to be invoked on mutually different computers connected to said computer connection network, so as to utilize performance data of said computer system of monitoring target.

33. A computer system according to claim 26, wherein said computer system of monitoring target is a distributed computer system which comprises plural computers selected from said plurality of computers included in said computer network;

wherein a capturing process is invoked on each of said plural computers selected so as to capture performance data of said each computer, wherein a collecting process is invoked on one of said plurality of computers included in said computer network, and collects, by way of said computer connection network, performance data captured by said capturing process invoked on each of said plural computers selected; and wherein said relaying process is programmed so as to execute said receiving operation in such a manner that said relaying process receives a plurality of performance data each for one of said plural computers selected, by way of said computer connection network from said collecting process invoked on said one of said plurality of computers included in said computer network computer.

34. A computer system according to claim 26, wherein said computer system of monitoring target is a computer system which comprises a plurality of nodes, each node is connected to said computer connection network, and each node comprises at least one processor;

wherein a capturing process is invoked on each node so as to capture performance data of said each node; and wherein said relaying process is programmed so as to execute receive operation in such a manner that said relaying process receives a plurality of performance data each for one of said plurality of nodes, each from said each node by way of said computer connection network.

35. A computer system according to claim 26, wherein said computer system of monitoring target comprises a plurality of processors and at least one processor connected to said computer connection network and to said plurality of processors;

wherein said computer system of monitoring target is programmed so that a capturing process invoked on each processor of said computer system of monitoring target captures performance data of said each processor, and a collecting process invoked on said one processor of said computer system of monitoring target collects said performance data which said capturing process invoked on each processor has captured; and wherein said relaying process is programmed so as to execute receive operation in such a manner that said relaying process receives a plurality of performance data of said plurality of processors of said computer system of monitoring target from said one processor of said computer system of monitoring target by way of said computer connection network.

36. A program storage medium according to claim 27, wherein said transferring of said performance data includes the steps of:

receiving, by said relaying program, a transfer request which requests transferring of part of performance data corresponding to part of said plurality of measurement items, as sent from one of said plurality of utilizing processes;

selecting, by said relaying program, said part of said performance data corresponding to said part of said measurement items requested by said transfer request sent by said one utilizing process, whenever said relaying process receives performance data from said computer system of monitoring target; and transferring, by said relaying program, said selected part of said performance data to said one utilizing process.

37. A program storage medium according to claim 27, wherein said relaying program is further programmed so as to execute a step of transferring a transfer request of performance data to said computer system of monitoring target; and wherein said receiving operation includes a step of receiving performance data sent by said computer system of monitoring target, after transferring said transfer request of performance data thereto.

38. A program storage medium according to claim 27, wherein said relaying program is further programmed so as to execute a step of notifying said computer system of monitoring target, of a plurality of measurement items performance data for which said computer system of monitoring target should capture, before one of said plurality of utilizing processes is invoked.

39. A program storage medium according to claim 27, wherein said relaying program is further programmed so as to execute the steps of:

performance data for which said computer of monitoring target should capture, sent from one of said plurality of utilizing processes when said one utilizing process is invoked; and requesting said computer system of monitoring target to capture performance data for said plurality of measurement items specified by said transfer request.

40. A program storage medium according to claim 27, wherein said relaying program is further programmed for enabling a visual display of said performance data of said computer system of monitoring target.

* * * * *